(12) United States Patent
Kirtley et al.

(10) Patent No.: US 12,465,824 B2
(45) Date of Patent: Nov. 11, 2025

(54) GOLF CLUB SHAFTS AND METHODS TO MANUFACTURE GOLF CLUB SHAFTS

(71) Applicant: PARSONS XTREME GOLF, LLC, Scottsdale, AZ (US)

(72) Inventors: Daniel C. Kirtley, Scottsdale, AZ (US); Bradley D. Schweigert, Cave Creek, AZ (US)

(73) Assignee: PARSON XTREME GOLF, LLC, Scottsdale, AZ (US)

( * ) Notice: Subject to any disclaimer, the term of this patent is extended or adjusted under 35 U.S.C. 154(b) by 659 days.

(21) Appl. No.: 17/939,758

(22) Filed: Sep. 7, 2022

(65) Prior Publication Data
US 2023/0338795 A1    Oct. 26, 2023

Related U.S. Application Data

(60) Provisional application No. 63/342,539, filed on May 16, 2022, provisional application No. 63/334,047, filed on Apr. 22, 2022.

(51) Int. Cl.
*A63B 53/10*     (2015.01)
*A63B 53/00*     (2015.01)
*B32B 1/08*      (2006.01)
*B32B 5/02*      (2006.01)
*B32B 15/08*     (2006.01)
(Continued)

(52) U.S. Cl.
CPC ............ *A63B 53/10* (2013.01); *A63B 53/007* (2013.01); *B32B 1/08* (2013.01); *B32B 5/02* (2013.01); *B32B 15/08* (2013.01); *B32B 15/18* (2013.01); *B32B 25/10* (2013.01); *B32B 2262/103* (2013.01); *B32B 2262/106* (2013.01); *B32B 2307/732* (2013.01)

(58) Field of Classification Search
CPC ....... A63B 53/10; A63B 53/007; A63B 53/12; A63B 60/06; A63B 60/08; A63B 60/54; B32B 1/08; B32B 5/02; B32B 5/26; B32B 7/02; B32B 15/08; B32B 15/18; B32B 15/02; B32B 25/10; B32B 25/14; B32B 25/042; B32B 2262/103; B32B 2262/106; B32B 2307/732; B32B 2597/00
See application file for complete search history.

(56) References Cited

U.S. PATENT DOCUMENTS 1,792,852 A * 2/1931 Mattern ................. A63B 53/02
                                                         473/312
1,894,841 A    1/1933 Adams
(Continued)

FOREIGN PATENT DOCUMENTS

WO    WO-2021167820 A1 * 8/2021 ............. A63B 60/08

*Primary Examiner* — Grant Moubry

(57) ABSTRACT

Examples of golf club shafts and methods to manufacture golf club shafts are generally described herein. In one example, a golf club shaft includes a first tubular portion formed from a first material and coupled to a second tubular portion having a plurality of layers formed from a second material and a third material. A reinforcing member is disposed in at least one of the plurality of layers and is formed from a fourth material. The reinforcing member extends a length that is less than or equal to a length of the second tubular portion. The first, second, third, and fourth materials are different from one another. Other examples and examples may be described and claimed.

20 Claims, 18 Drawing Sheets

(51) Int. Cl.
  *B32B 15/18* (2006.01)
  *B32B 25/10* (2006.01)

(56) References Cited

U.S. PATENT DOCUMENTS

| | | |
|---|---|---|
| 1,950,342 A | 3/1934 | Meshel |
| 3,313,541 A * | 4/1967 | Benkoczy .............. A63B 53/10 |
| | | 273/DIG. 7 |
| 3,468,538 A | 9/1969 | Johnson |
| 3,762,707 A | 10/1973 | Santorelli |
| 4,516,778 A | 5/1985 | Cleveland |
| 4,541,631 A | 9/1985 | Sasse |
| 5,082,279 A | 1/1992 | Hull et al. |
| 5,607,364 A | 3/1997 | Hedrick et al. |
| 5,685,783 A * | 11/1997 | Akatsuka .............. A63B 53/10 |
| | | 273/DIG. 7 |
| 5,766,090 A | 6/1998 | Orlowski |
| 5,776,008 A * | 7/1998 | Lundberg .............. A63B 53/10 |
| | | 473/320 |
| 5,873,793 A | 2/1999 | Swinford |
| 5,904,628 A | 5/1999 | MacKay, Jr. et al. |
| 5,913,734 A | 6/1999 | Tanaka |
| 5,943,758 A * | 8/1999 | Haas ...................... A63B 53/10 |
| | | 29/516 |
| 6,302,806 B1 | 10/2001 | Hsu |
| 6,514,156 B1 | 2/2003 | Zorzi |
| 6,595,868 B1 | 7/2003 | Androlia |
| 6,820,654 B2 | 11/2004 | Lindsay |
| 6,866,593 B1 * | 3/2005 | Cheng .................... A63B 53/10 |
| | | 473/320 |
| 7,090,589 B2 | 8/2006 | Andersen |
| 7,497,786 B2 | 3/2009 | Cheng |
| 7,857,707 B2 | 12/2010 | Beppu |
| 7,862,448 B2 | 1/2011 | Tanio |
| 7,967,697 B2 | 6/2011 | Jung |
| 8,747,261 B2 | 6/2014 | McGuire, Jr. et al. |
| 9,199,136 B2 * | 12/2015 | Rice ...................... A63B 60/42 |
| 9,814,952 B2 | 11/2017 | Parsons et al. |
| 10,596,424 B2 | 3/2020 | Parsons et al. |
| 2004/0082402 A1 | 4/2004 | Unosawa |
| 2004/0092329 A1 * | 5/2004 | Meyer .................... A63B 60/54 |
| | | 473/319 |
| 2005/0137026 A1 | 6/2005 | Stites et al. |
| 2021/0252352 A1 | 8/2021 | Greenwood et al. |

* cited by examiner

US 12,465,824 B2

GOLF CLUB SHAFTS AND METHODS TO MANUFACTURE GOLF CLUB SHAFTS

CROSS REFERENCE

The present application claims the benefit of U.S. Provisional Application No. 63/342,539, filed May 16, 2022, and U.S. Provisional Application No. 63/334,047, filed Apr. 22, 2022, the disclosures of which are incorporated by reference herein.

COPYRIGHT AUTHORIZATION

The present disclosure may be subject to copyright protection. The copyright owner has no objection to the facsimile reproduction by anyone of the present disclosure and its related documents, as they appear in the Patent and Trademark Office patent files or records, but otherwise reserves all applicable copyrights.

FIELD

The present disclosure generally relates to golf equipment, and more particularly, to golf club shafts and methods to manufacturing golf club shafts.

BACKGROUND

Golf clubs typically include a golf club head attached to a shaft with a grip. Golf club shafts may be manufactured from a variety of materials to affect certain performance characteristics. A golf club shaft is described herein having improved stability and feel for imparting greater consistency during a golf swing.

Figure 1:
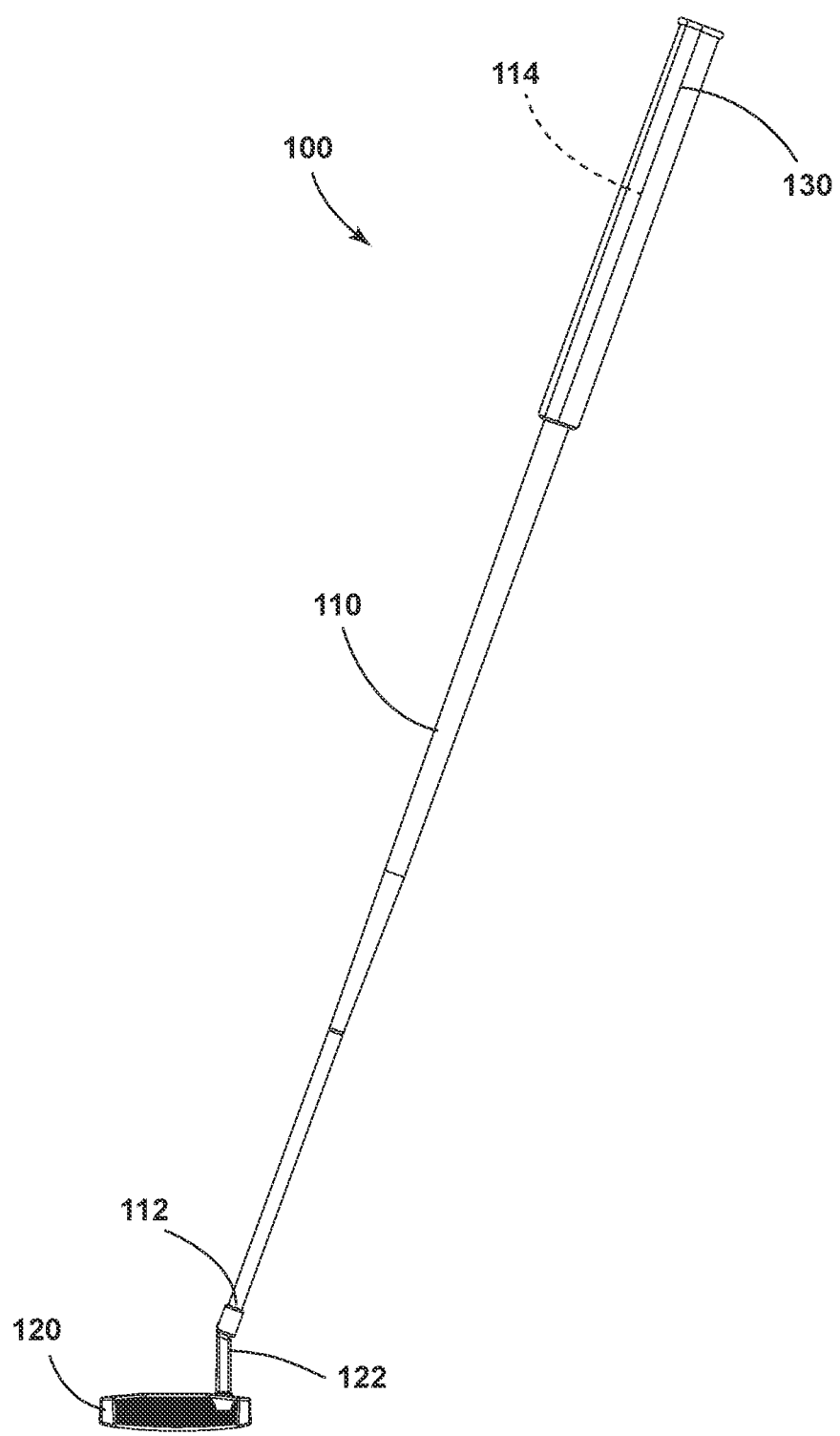
FIG. 1 depicts a front perspective view of a golf club according to an example of the apparatus, methods, and articles of manufacture described herein.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures may not be depicted to scale. For example, the dimensions of some of the elements in the figures may be exaggerated relative to other elements to help improve understanding of examples of the present disclosure.

DESCRIPTION

In general, golf club shafts and methods to manufacture golf club shafts are described herein. The apparatus, methods, and articles of manufacture described herein are not limited in this regard.

In the example of FIG. 1, a golf club 100 is shown including a golf club shaft 110 having a tip end portion 112 and a butt end portion 114. A golf club head 120 may be coupled to the tip end portion 112 and is generally shown as a putter type golf club head (e.g., a blade style putter, a mid-mallet style putter, or a mallet style putter). The golf club head 120 may include a hosel 122 or a bore (not shown) coupled to the tip end portion 112 and a grip 130 coupled to the butt end portion 114. In one example, the tip end portion 112 may be at least partially received inside the hosel 122 or bore. Alternatively, the hosel 122 may be configured to be at least partially received inside the tip end portion 112. The hosel 122 or bore may be engaged to the tip end portion 112 using epoxy or other adhesive. The grip 130 may be slidably received over the butt end portion 114 and may be engaged to the butt end portion 114 using grip tape and grip tape solvent. The apparatus, methods, and articles of manufacture described herein are not limited in this regard.

Figure 2:
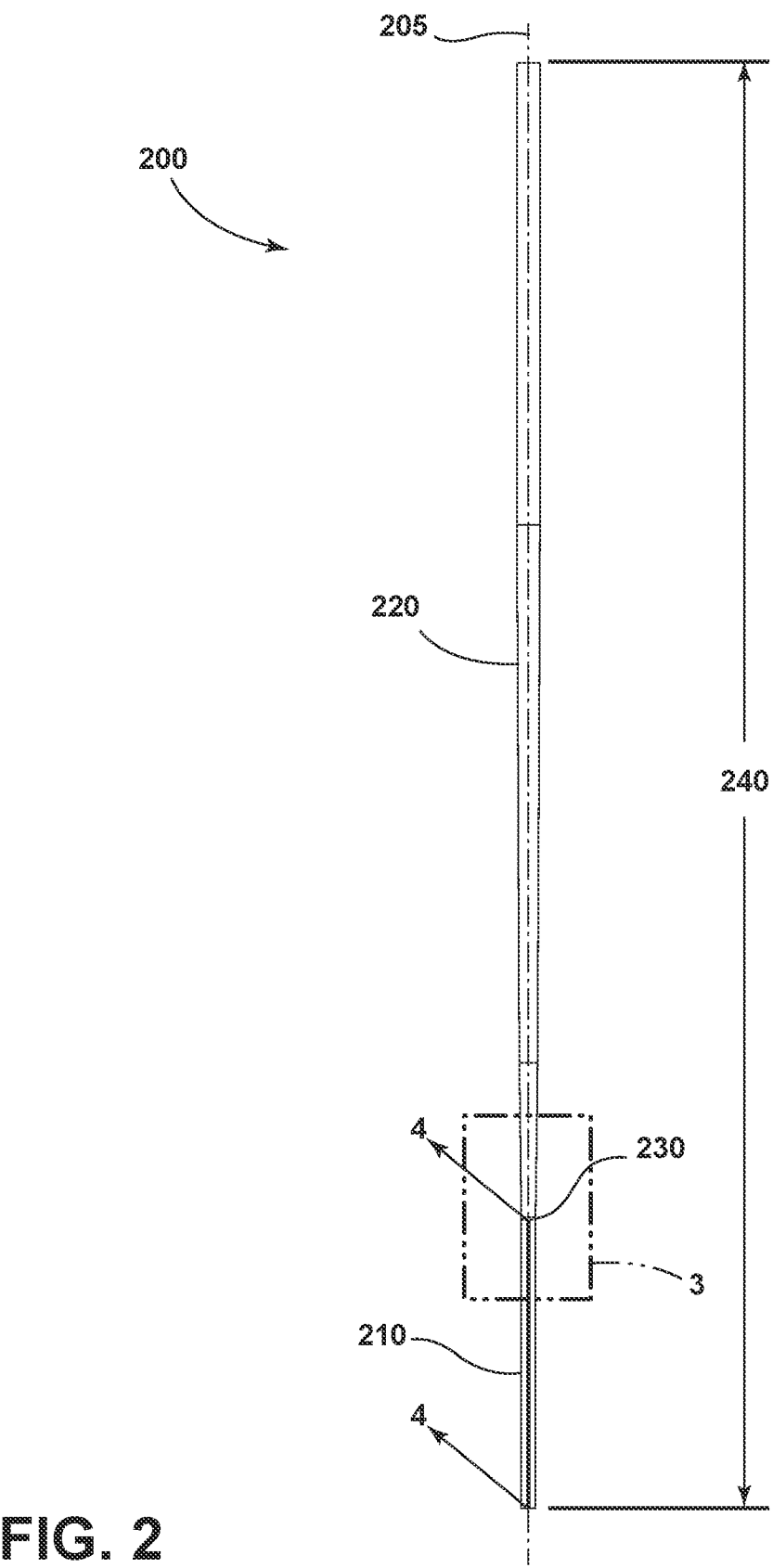
FIG. 2 depicts a golf club shaft according to an example of the apparatus, methods, and articles of manufacture described herein.
Figure 3:
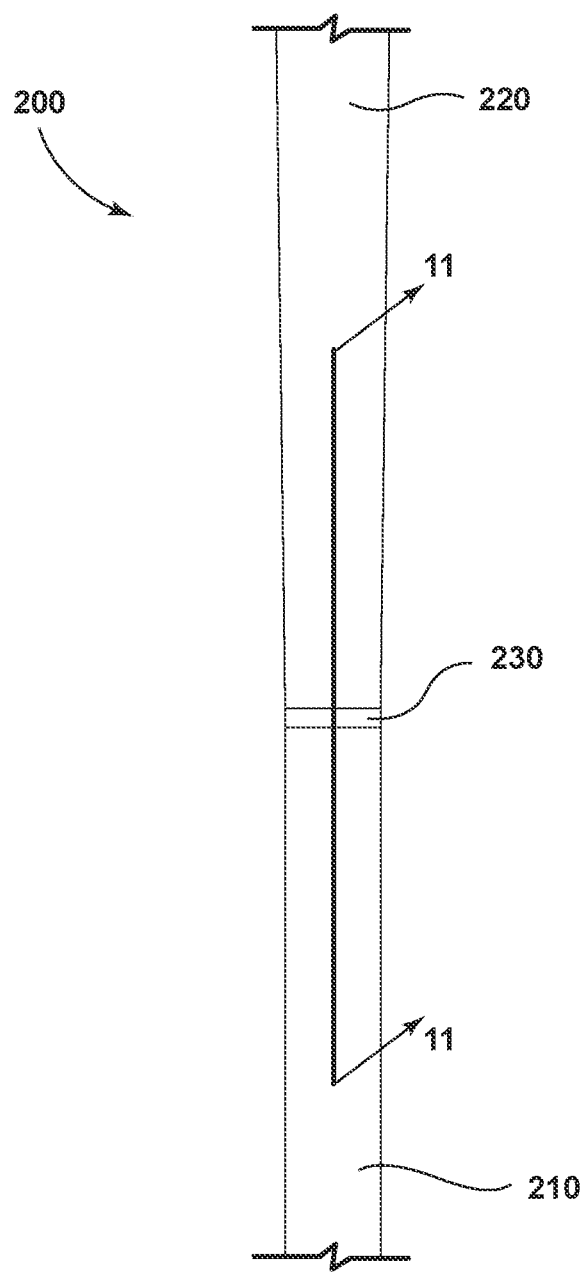
FIG. 3 is an enlarged view of the area specified by reference numeral 3 in FIG. 2.

In the example of FIGS. 2 and 3, a golf club shaft 200 may be an elongate tubular structure with a bore axis 205. The golf club shaft 200 may be defined by a first tubular portion 210 coupled to a second tubular portion 220. The first tubular portion 210 may be formed from a metal material having high tensile strength, high stiffness, and malleable properties. In this manner, the first tubular portion 210 may be provided in a straight, curved, or bent configuration to accommodate a variety of hosel types, bore types, and swing styles. The second tubular portion 220 may be formed from a plurality of materials. In one example, the second tubular portion 220 may be formed substantially from a composite material having a high strength-to-weight ratio and a high stiffness-to-weight ratio. Accordingly, the second tubular portion 220 may be constructed with a thickness that is greater than a thickness of a steel counterpart, thereby improving the overall stiffness of the golf club shaft 200 over a steel shaft. As a result, the golf club shaft 200 may feel more stable in the hands of a golfer. In another example, in addition to the composite material, the second tubular portion 220 may incorporate an elastomer material having sound and/or vibration dampening properties and a metal material to supplement or enhance the overall stiffness and feel of the golf club shaft 200. The apparatus, methods, and articles of manufacture described herein are not limited in this regard.

The golf club shaft 200 may also include a spacer 230 disposed between the first tubular portion 210 and the second tubular portion 220. In one example, the spacer 230 may be formed from a plastic material and may be configured to smoothen a transition between the first tubular portion 210 and the second tubular portion 220. Additionally, the spacer 230 may protect adjoining ends of the first tubular portion 210 and the second tubular portion 220 and may provide sound and/or vibration dampening properties. In another example, the spacer 230 may be formed from a ceramic material or a metal material. The apparatus, methods, and articles of manufacture described herein are not limited in this regard.

The golf club shaft 200 may be configured in a variety of lengths to accommodate golfers of different heights. In one example, the golf club shaft 200 may have a shaft length 240 ($L_1$) greater than or equal to 27 inches (68.58 cm) and less than or equal to 45 inches (114.3 cm). In another example, the shaft length 240 may be greater than or equal to 28 inches (71.12 cm) and less than or equal to 40 inches (101.6 cm). In yet another example, the shaft length 240 may be greater than or equal to 29 inches (73.66 cm) and less than or equal to 35 inches (88.9 cm). The golf club shaft 200 may have a balance point measured from a tip of the golf club shaft 200 that is less than or equal to 50% of the shaft length 240. The apparatus, methods, and articles of manufacture described herein are not limited in this regard.

Figure 4:
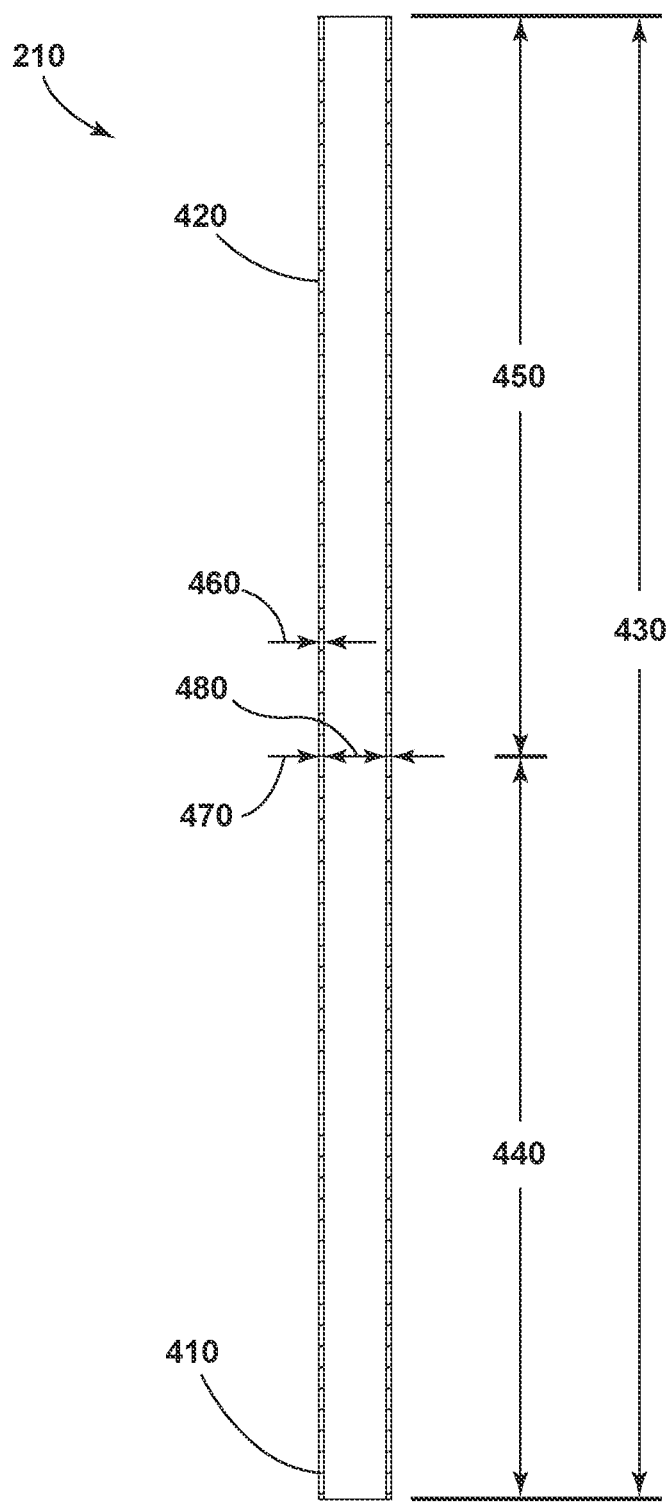
FIG. 4 is a cross sectional view of a first tubular portion of the golf club shaft of FIG. 2 taken along lines 4-4 of FIG. 2.

With reference to FIG. 4, the first tubular portion 210 may include a tip end portion 410 and a distal end portion 420. In one example, the first tubular portion 210 may have a length 430 ($L_2$) that is less than or equal to 30% of the shaft length 240 ($L_2 \leq 0.30L_1$). In another example, the length 430 of the first tubular portion 210 may be greater than or equal to 16% of the shaft length 240 ($L_2 \geq 0.16L_1$) and less than or equal to 28% of the shaft length 240 ($L_2 \leq 0.28L_1$). In another example, the length 430 of the first tubular portion 210 may be greater than or equal to 18% of the shaft length 240 ($L_2 \geq 0.18L_1$) and less than or equal to 27% of the shaft length 240 ($L_2 \leq 0.27L_1$). In yet another example, the length 430 of the first tubular portion 210 may be greater than or equal to 20% of the shaft length 240 ($L_2 \geq 0.20L_1$) and less than or equal to 25% of the shaft length 240 ($L_2 \leq 0.25L_1$). In one example, the tip end portion 410 may have a length 440 ($L_3$) that is equal or about equal to 50% of the length 430 of the first tubular portion 210 ($L_3 \approx 0.5L_2$). In another example, the tip end portion 410 may have a length 440 ($L_3$) that is less than 50% of the length 430 of the first tubular portion 210 ($L_3 < 0.5L_2$). Likewise, in one example, the distal end portion 420 may have a length 450 ($L_4$) that is equal or about equal to 50% of the length 430 of the first tubular portion 210 ($L_4 \approx 0.5L_2$). In another example, the distal end portion 420 may have a length 450 ($L_4$) that is less than 50% of the length 430 of the first tubular portion 210 ($L_4 < 0.5L_2$). The apparatus, methods, and articles of manufacture described herein are not limited in this regard.

The first tubular portion 210 may have a shaft profile characterized by a hollow cylindrical shape, at least a portion of which extends along the bore axis 205 (e.g., see FIG. 2) of the golf club shaft 200. In other examples, the first tubular portion 210, or a portion(s) thereof, may have other shapes including, but limited to, a frustoconical shape, a stepped shape, or any combination thereof. For exemplary purposes, the first tubular portion 210 is depicted in a straight configuration but may be alternatively provided in a curved or bent configuration to accommodate different hosel or bore types. The first tubular portion 210 may have a uniform or variable wall thickness 460 (WE) defined by an outer diameter 470 ($OD_1$) and an inner diameter 480 ($ID_1$). In one example, the wall thickness 460 of the first tubular portion 210 may be uniform and may be greater than or equal 0.005 inch (0.127 mm) and less than or equal to 0.045 inch (1.143 mm). The outer diameter 470 of the first tubular portion 210 may be greater than or equal to 0.350 inch (8.89 mm) and less than or equal to 0.390 inch (9.906 mm) and the inner diameter 480 of the first tubular portion 210 may be greater than or equal to 0.300 inch (7.62 mm) and less than or equal to 0.340 inch (8.636 mm). In another example, the wall thickness 460 of the first tubular portion 210 may be uniform and may be greater than or equal to 0.010 inch (0.254 mm) and less than or equal to 0.040 inch (1.016 mm). The outer diameter 470 of the first tubular portion 210 may be greater than or equal to 0.355 inch (9.017 mm) and less than or equal to 0.385 inch (9.779 mm) and the inner diameter 480 of the first tubular portion 210 may be greater than or equal to 0.305 inch (7.747 mm) and less than or equal to 0.335 inch (8.509 mm). In yet another example, the wall thickness 460 of the first tubular portion 210 may be uniform and may be greater than or equal to 0.015 inch (0.381 mm) and less than or equal to 0.035 inch (0.889 mm). The outer diameter 470 of the first tubular portion 210 may be greater than or equal to 0.360 inch (9.144 mm) and less than or equal to 0.380 inch (9.652 mm) and the inner diameter 480 of the first tubular portion 210 may be greater than or equal to 0.310 inch (7.874 mm) and less than or equal to 0.330 inch (8.382 mm). The apparatus, methods, and articles of manufacture described herein are not limited in this regard.

The first tubular portion 210 may be formed from a steel material such as, but not limited to, 4140 steel. In one example, the first tubular portion 210 may have a mass per unit length ($mpl_1$) that is greater than or equal to 2.8 grams per inch and less than or equal to 4.2 grams per inch. In another example, the first tubular portion 210 may have a mass per unit length that is greater than or equal to 3.0 grams per inch and less than or equal to 4.0 grams per inch. In yet another example, the first tubular portion 210 may have a mass per unit length that is greater than or equal to 3.10 grams per inch and less than or equal to 3.90 grams per inch. The apparatus, methods, and articles of manufacture described herein are not limited in this regard.

Figure 5:
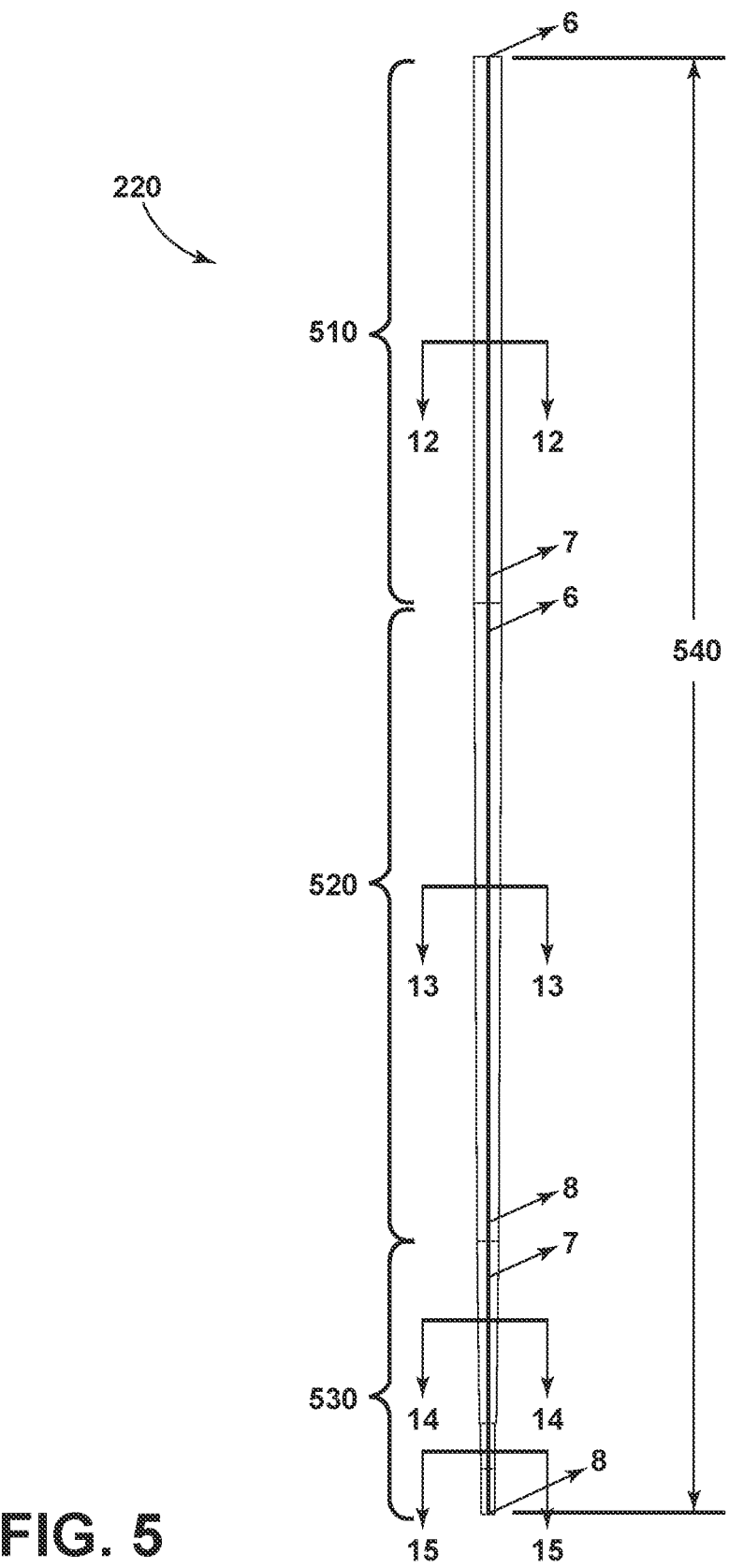
FIG. 5 depicts a second tubular portion of the golf club shaft of FIG. 2.

With reference to FIG. 5, the second tubular portion 220 may include a butt end portion 510, an intermediate portion 520, and a proximal end portion 530 configured to couple with the distal end portion 420 of the first tubular portion 210. The second tubular portion 220 may have a hollow structure extending a length 540 ($L_5$) along the bore axis 205 (e.g., see FIG. 2) of the golf club shaft 200. In one example, the length 540 of the second tubular portion 220 may be greater than or equal to 78% of the shaft length 240 ($L_5 \geq 0.78L_1$) and less than or equal to 88% of the shaft length 240 ($L_5 \leq 0.88L_1$). In another example, the length 540 of the second tubular portion 220 may be greater than or equal to 79% of the shaft length 240 ($L_5 \geq 0.79L_1$) and less than or equal to 87% of the shaft length 240 ($L_5 \leq 0.87L_1$). In yet another example, the length 540 of the second tubular portion 220 may be greater than or equal to 80% of the shaft length 240 ($L_5 \geq 0.80L_1$) and less than or equal to 85% of the shaft length 240 ($L_5 \leq 0.85L_1$). The apparatus, methods, and articles of manufacture described herein are not limited in this regard.

Figure 6:
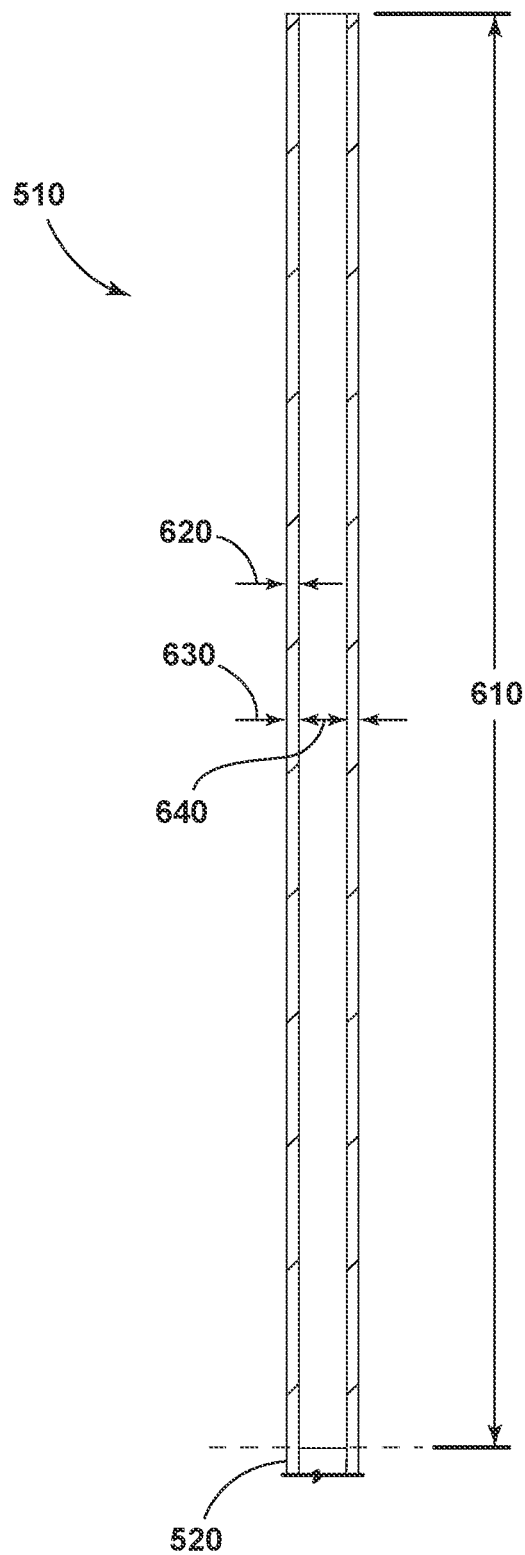
FIG. 6 is a cross sectional view taken along lines 6-6 of FIG. 5.

With reference to FIG. 6, the butt end portion 510 may have a shaft profile characterized by a hollow cylindrical shape extending a length 610 ($L_6$) toward the intermediate portion 520. In one example, the length 610 of the butt end portion 510 may be greater than or equal to 6% of the length 540 of the second tubular portion 220 ($L_6 \geq 0.06L_5$) and less than or equal to 50% of the length 540 of the second tubular portion 220 ($L_6 \leq 0.50L_5$). In another example, the length 610 of the butt end portion 510 may be greater than or equal to 10% of the length 540 of the second tubular portion 220 ($L_6 \geq 0.10L_5$) and less than or equal to 43% of the length 540 of the second tubular portion 220 ($L_6 \leq 0.43L_5$). In yet another example, the length 610 of the butt end portion 510 may be greater than or equal to 14% of the length 540 of the second tubular portion 220 ($L_6 \geq 0.14L_5$) and less than or equal to 33% of the length 540 of the second tubular portion 220 ($L_6 \leq 0.33L_5$). The butt end portion 510 may have a uniform or variable wall thickness 620 ($WT_2$) defined by an outer diameter 630 ($OD_2$) and an inner diameter 640 ($ID_2$). In one example, the wall thickness 620 of the butt end portion 510 may be uniform and may be greater than or equal to 0.080 inch (2.032 mm) and less than or equal to 0.120 inch (3.048 mm). The outer diameter 630 of the butt end portion 510 may be greater than or equal to 0.580 inch (14.732 mm) and less than or equal to 0.620 inch (15.748 mm) and the inner diameter 640 of the butt end portion 510 may be greater than or equal to 0.380 inch (9.652 mm) and less than or equal to 0.420 inch (10.668 mm). In another example, the wall thickness 620 of the butt end portion 510 may be uniform and may be greater than or equal 0.085 inch (2.159 mm) and less than or equal to 0.115 inch (2.921 mm). The outer diameter 630 of the butt end portion 510 may be greater than or equal to 0.585 inch (14.859 mm) and less than or equal to 0.615 inch (15.621 mm) and the inner diameter 640 of the butt end portion 510 may be greater than or equal to 0.385 inch (9.779 mm) and less than or equal to 0.415 inch (10.541 mm). In yet another example, the wall thickness 620 of the butt end portion 510 may be uniform and may be greater than or equal to 0.090 inch (2.286 mm) and less than or equal to 0.110 inch (2.794 mm). The outer diameter 630 of the butt end portion 510 may be greater than or equal to 0.590 inch (14.986 mm) and less than or equal to 0.610 inch (15.494 mm) and the inner diameter 640 of the butt end portion 510 may be greater than or equal to 0.390 inch (9.906 mm) and less than or equal to 0.410 inch (10.414 mm). The apparatus, methods, and articles of manufacture described herein are not limited in this regard.

Figure 7:
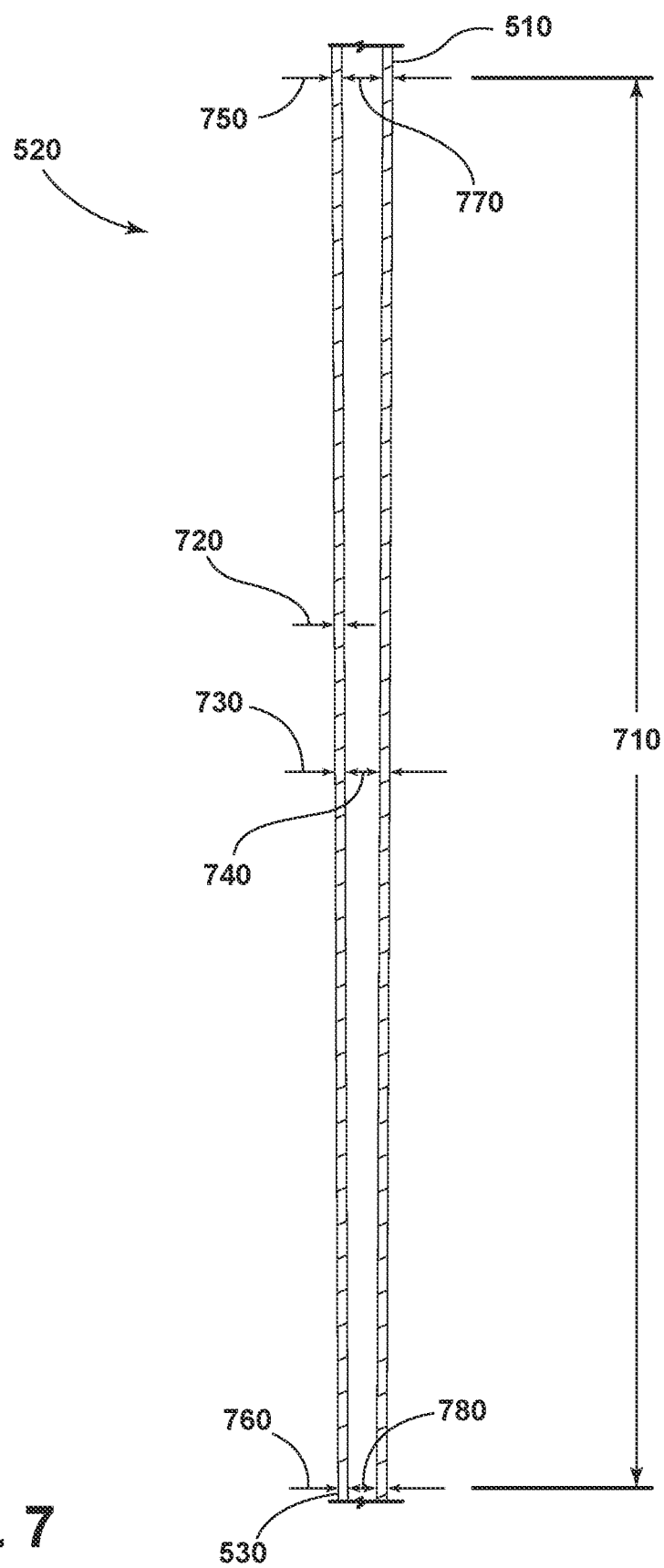
FIG. 7 is a cross sectional view taken along lines 7-7 of FIG. 5.

With reference to FIG. 7, the intermediate portion 520 may have a shaft profile characterized by a hollow frusto-conical shape extending a length 710 ($L_7$) downward from the butt end portion 510 and towards the proximal end portion 530. In one example, the length 710 of the intermediate portion 520 may be greater than or equal to 35% of the length 540 of the second tubular portion 220 ($L_7 \geq 0.35L_5$) and less than or equal to 66% of the length 540 of the second tubular portion 220 ($L_7 \leq 0.66L_5$). In another example, the length 710 of the intermediate portion 520 may be greater than or equal to 40% of the length 540 of the second tubular portion 220 ($L_7 \geq 0.40L_5$) and less than or equal to 63% of the length 540 of the second tubular portion 220 ($L_7 \leq 0.63L_5$). In yet another example, the length 710 of the intermediate portion 520 may be greater than or equal to 47% of the length 540 of the second tubular portion 220 ($L_7 \geq 0.47L_5$) and less than or equal to 60% of the length 540 of the second tubular portion 220 ($L_7 \leq 0.60L_5$). The intermediate portion 520 may have a uniform or variable wall thickness 720 ($WT_3$) defined by a variable outer diameter 730 ($OD_3$) and a variable inner diameter 740 ($ID_3$) that decrease towards the proximal end portion 530. In one example, the outer diameter 730 of the intermediate portion 520 may taper or transition from a maximum outer diameter 750 ($OD_{3max}$) to a minimum outer diameter 760 ($OD_{3min}$) over the length 710 of the intermediate portion 520 and the inner diameter 740 of the intermediate portion 520 may taper or transition from a maximum inner diameter 770 ($ID_{3max}$) to a minimum inner diameter 780 ($ID_{3min}$) over the length 710 of the intermediate portion 520. The apparatus, methods, and articles of manufacture described herein are not limited in this regard.

The maximum outer diameter 750 of the intermediate portion 520 may be less than or equal to the outer diameter 630 of the butt end portion 510 ($OD_{3max} \leq OD_2$) and the maximum inner diameter 770 of the intermediate portion 520 may be less than or equal to the inner diameter 640 of the butt end portion 510 ($ID_{3max} \leq ID_2$). In one example, the wall thickness 720 of the intermediate portion 520 may be uniform and may be greater than or equal to 0.080 inch (2.032 mm) and less than or equal to 0.120 inch (3.048 mm). The maximum outer diameter 750 of the intermediate portion 520 may be greater than or equal to 0.580 inch (14.732 mm) and less than or equal to 0.620 inch (15.748 mm) and the minimum outer diameter 760 of the intermediate portion 520 may be greater than or equal to 0.455 inch (11.557 mm) and less than or equal to 0.495 inch (12.573 mm). The maximum inner diameter 770 of the intermediate portion 520 may be greater than or equal to 0.380 inch (9.652 mm) and less than or equal to 0.420 inch (10.668 mm) and the minimum inner diameter 780 of the intermediate portion 520 may be greater than or equal to 0.255 inch (6.477 mm) and less than or equal to 0.295 inch (7.493 mm). In another example, the wall thickness 720 of the intermediate portion 520 may be uniform and may be greater than or equal to 0.085 inch (2.159 mm) and less than or equal to 0.115 inch (2.921 mm). The maximum outer diameter 750 of the intermediate portion 520 may be greater than or equal to 0.585 inch (14.859 mm) and less than or equal to 0.615 inch (15.621 mm) and the minimum outer diameter 760 may be greater than or equal to 0.460 inch (11.684 mm) and less than or equal to 0.490 inch (12.446 mm). The maximum inner diameter 770 of the intermediate portion 520 may be greater than or equal to 0.385 inch (9.779 mm) and less than or equal to 0.415 inch (10.541 mm) and the minimum inner diameter 780 of the intermediate portion 520 may be greater than or equal to 0.260 inch (6.604 mm) and less than or equal to 0.290 inch (7.366 mm). In yet another example, the wall thickness 720 may be uniform and may be greater than or equal to 0.090 inch (2.286 mm) and less than or equal to 0.110 inch (2.794 mm). The maximum outer diameter 750 of the intermediate portion 520 may be greater than or equal to 0.590 inch (14.986 mm) and less than or equal to 0.610 inch (15.494 mm) and the minimum outer diameter 760 of the intermediate portion 520 may be greater than or equal to 0.465 inch (11.811 mm) and less than or equal to 0.485 inch (12.319 mm). The maximum inner diameter 770 of the intermediate portion 520 may be greater than or equal to 0.390 inch (9.906 mm) and less than or equal to 0.410 inch (10.414 mm) and the minimum inner diameter 780 of the intermediate portion 520 may be greater than or equal to 0.265 inch (6.731 mm) and less than or equal to 0.285 inch (7.239 mm). The apparatus, methods, and articles of manufacture described herein are not limited in this regard.

The intermediate portion 520 may have an outer diameter taper rate ($OD_{TR1}$) defined as the change between the maximum outer diameter 750 and the minimum outer diameter 760 over the length 710 of the intermediate portion 520

$$\left(OD_{TR1} = \frac{OD_{3max} - OD_{3min}}{L_7}\right).$$

The intermediate portion 520 may also have an inner diameter taper rate ($ID_{TR1}$) defined as the change between the maximum inner diameter 770 and the minimum inner diameter 780 over the length 710 of the intermediate portion 520

$$\left(ID_{TR1} = \frac{ID_{3max} - ID_{3min}}{L_7}\right).$$

The outer and inner diameter taper rates of the intermediate portion 520 may be similar or different. In one example, the outer and inner diameter taper rates of the intermediate portion 520 may be greater than or equal to $6.07 \times 10^{-3}$ and less than or equal to $11.78 \times 10^{-3}$. In another example, the outer and inner diameter taper rates of the intermediate portion 520 may be greater than or equal to $6.78 \times 10^{-3}$ and less than or equal to $11.07 \times 10^{-3}$. In yet another example, the outer and inner diameter taper rates of the intermediate portion 520 may be greater than or equal to $7.50 \times 10^{-3}$ and less than or equal to $10.35 \times 10^{-3}$. The apparatus, methods, and articles of manufacture described herein are not limited in this regard.

Figure 8:
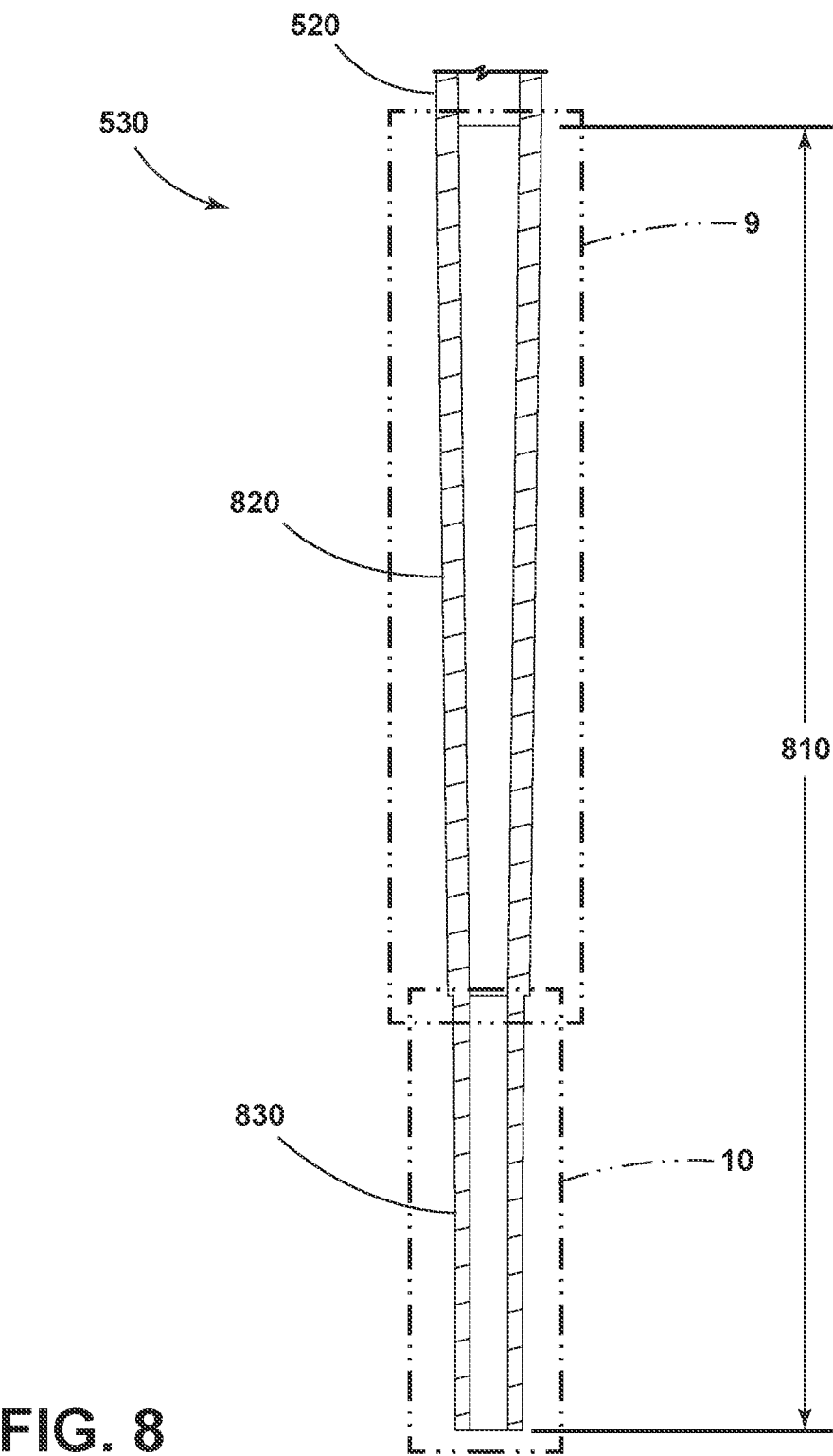
FIG. 8 is a cross sectional view taken along lines 8-8 of FIG. 5

With reference to FIGS. 8, the proximal end portion 530 may have a shaft profile characterized by a hollow stepped shape extending a length 810 ($L_8$) downward from the intermediate portion 520. The proximal end portion 530 may be defined by a neck portion 820 and an insert portion 830. In one example, the length 810 of the proximal end portion 530 may be greater than or equal to 15% of the length 540 of the second tubular portion 220 ($L_8 \geq 0.15L_5$) and less than or equal to 28% of the length 540 of the second tubular portion 220 ($L_8 \leq 0.28L_5$). In another example the length 810 of the proximal end portion 530 may be greater than or equal to 17% of the length 540 of the second tubular portion 220 ($L_8 \geq 0.17L_5$) and less than or equal to 27% of the length 540 of the second tubular portion 220 ($L_8 \leq 0.27L_5$). In yet another example, the length 810 of the proximal end portion 530 may be greater than or equal to 20% of the length 540 of the second tubular portion 220 ($L_8 \geq 0.20L_5$) and less than or equal to 26% of the length 540 of the second tubular portion 220 ($L_8 \leq 0.26L_5$). The apparatus, methods, and articles of manufacture described herein are not limited in this regard.

Figure 9:
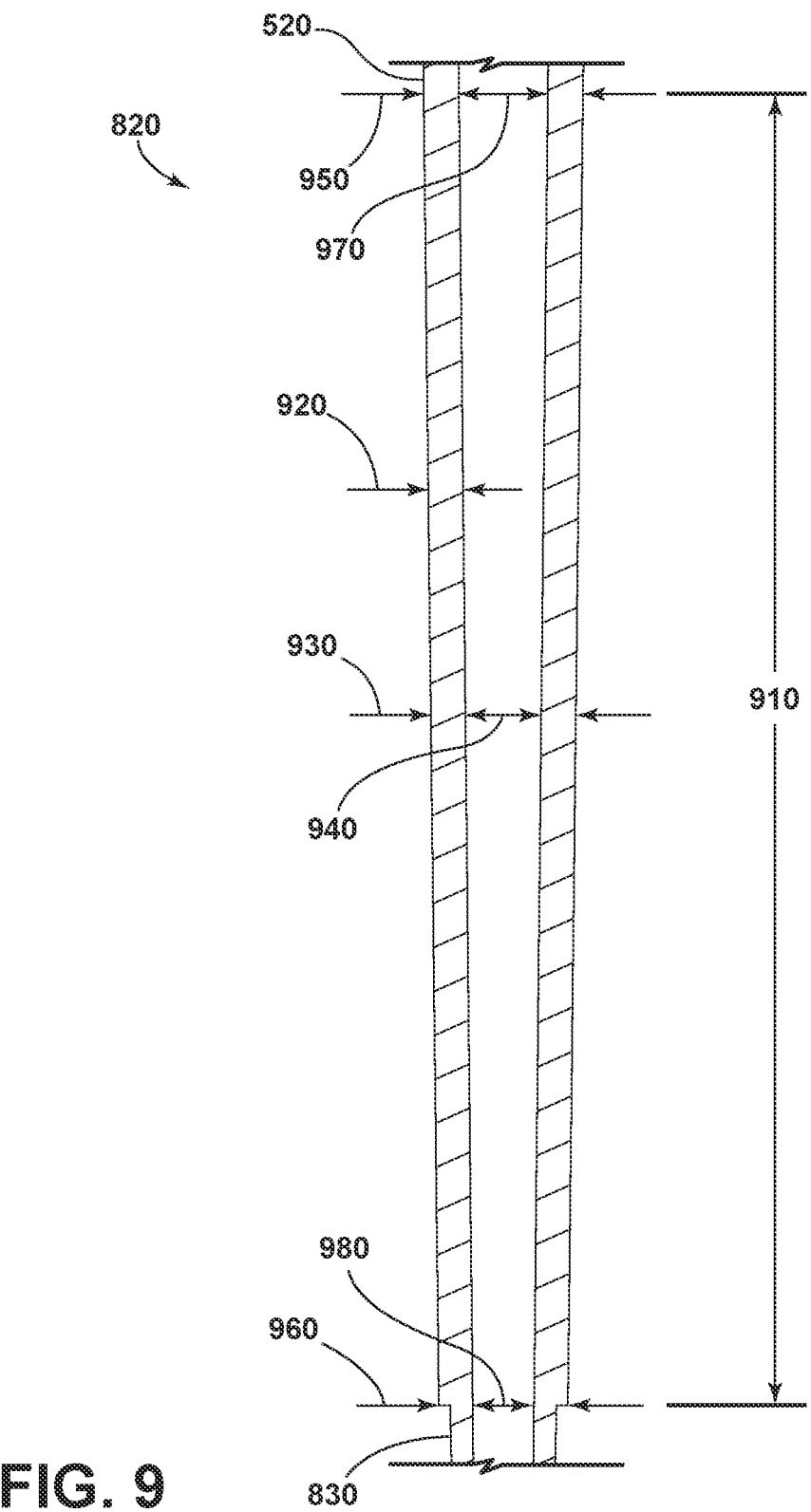
FIG. 9 is an enlarged view of the area specified by reference numeral 9 in FIG. 8.

With reference to FIG. 9, the neck portion 820 may have a shaft profile characterized by a hollow frustoconical shape extending a length 910 ($L_9$) downward from the intermediate portion 520 and toward the insert portion 830. In one example, the length 910 of the neck portion 820 may be greater than or equal to 10% of the length 540 of the second tubular portion 220 ($L_9 \geq 0.10L_5$) and less than or equal to 19% of the length 540 of the second tubular portion 220 ($L_9 \leq 0.19L_5$). The neck portion 820 may have a uniform or variable wall thickness 920 ($WT_4$) defined by a variable outer diameter 930 ($OD_4$) and a variable inner diameter 940 ($ID_4$) that decrease in a downward direction from the intermediate portion 520 to the insert portion 830. In one example, the outer diameter 930 of the neck portion 820 may taper or transition from a maximum outer diameter 950 ($OD_{4max}$) to a minimum outer diameter 960 ($OD_{4min}$) over the length 910 of the neck portion 820 and the inner diameter 940 of the neck portion 820 may taper or transition from a maximum inner diameter 970 ($ID_{4max}$) to a minimum inner diameter 980 ($ID_{4min}$) over the length 910 of the neck portion 820. The apparatus, methods, and articles of manufacture described herein are not limited in this regard.

The maximum outer diameter 950 of the neck portion 820 may be less than or equal to the minimum outer diameter 760 of the intermediate portion 520 ($OD_{4max} \leq OD_{3min}$) and the minimum outer diameter 960 of the neck portion 820 may be greater than or equal to the outer diameter 470 of the first tubular portion 210 ($OD_{4min} \geq OD_1$). The maximum inner diameter 970 of the neck portion 820 may be less than or equal to the minimum inner diameter 780 of the intermediate portion 520 ($ID_{4max} \leq ID_{3min}$) and the minimum inner diameter 980 of the neck portion 820 may be less than the inner diameter 480 of the first tubular portion 210 ($ID_{4min} < ID_1$). In one example, the wall thickness 920 of the neck portion 820 may be uniform and may be greater than or equal to 0.080 inch (2.032 mm) and less than or equal to 0.120 inch (3.048 mm). The maximum outer diameter 950 of the neck portion 820 may be greater than or equal to 0.455 inch (11.557 mm) and less than or equal to 0.495 inch (12.573 mm) and the minimum outer diameter 960 of the neck portion 820 may be greater than or equal to 0.350 inch and less than or equal to 0.390 inch (9.906 mm). The maximum inner diameter 970 of the neck portion 820 may be greater than or equal to 0.255 inch (6.477 mm) and less than or equal to 0.295 inch (7.493 mm) and the minimum inner diameter 980 of the neck portion 820 may be greater than or equal to 0.150 inch (3.81 mm) and less than or equal to 0.190 inch (4.826 mm). In another example, the wall thickness 920 of the neck portion 820 may be uniform and may be greater than or equal to 0.085 inch (2.159 mm) and less than or equal 0.115 inch (2.921 mm). The maximum outer diameter 950 of the neck portion 820 may greater than or equal to 0.460 inch (11.684 mm) and less than or equal to 0.490 inch (12.446 mm) and the minimum outer diameter 960 of the neck portion 820 may be greater than or equal to 0.355 inch (9.017 mm) and less than or equal to 0.385 inch (9.779 mm). The maximum inner diameter 970 of the neck portion 820 may be greater than or equal to 0.260 inch (6.604 mm) and less than or equal to 0.290 inch (7.366 mm) and the minimum inner diameter 980 of the neck portion 820 may be greater than or equal to 0.155 inch (3.937 mm) and less than or equal to 0.185 inch (4.699 mm). In yet another example, the wall thickness 920 of the neck portion 820 may be greater than or equal to 0.090 inch (2.286 mm) and less than or equal to 0.110 inch (2.794 mm). The maximum outer diameter 950 of the neck portion 820 may be greater than or equal to 0.465 inch (11.811 mm) and less than or equal to 0.485 inch (12.319 mm) and the minimum outer diameter 960 of the neck portion 820 may be greater than or equal to 0.360 inch (9.144 mm) and less than or equal to 0.380 inch (9.652 mm). The maximum inner diameter 970 of the neck portion 820 may be greater than or equal to 0.265 inch (6.731 mm) and less than or equal to 0.285 inch (7.239 mm) and the minimum inner diameter 980 of the neck portion 820 may be greater than or equal to 0.160 inch (4.064 mm) and less than or equal to 0.180 inch (4.572 mm). The apparatus, methods, and articles of manufacture described herein are not limited in this regard.

The neck portion 820 may have an outer diameter taper rate ($OD_{TR2}$) defined as the change between the maximum outer diameter 950 and the minimum outer diameter 960 over by the length 910 of the neck portion 820

$$\left(OD_{TR2} = \frac{OD_{4max} - OD_{4min}}{L_9}\right).$$

The neck portion 820 may also have an inner diameter taper rate ($ID_{TR2}$) defined as the change between the maximum inner diameter 970 and the minimum inner diameter 980 over the length 910 of the neck portion 820

$$\left(ID_{TR2} = \frac{ID_{4max} - ID_{4min}}{L_9}\right).$$

The outer and inner diameter taper rates of the neck portion 820 may be similar or different. In one example, the outer diameter taper rate and the inner diameter taper rate of the neck portion 820 may be greater than or equal to $1.62 \times 10^{-2}$ and less than or equal to $3.62 \times 10^{-2}$. In another example, the outer diameter taper rate and the inner diameter taper rate of the neck portion 820 may be greater than or equal to $1.87 \times 10^{-2}$ and less than or equal to $3.37 \times 10^{-2}$. In yet another example, the outer diameter taper rate and the inner diameter taper rate of the neck portion 820 may be greater than or equal to $2.12 \times 10^{-2}$ and less than or equal to $3.12 \times 10^{-2}$. With respect to the illustrated example, the outer diameter taper rate of the neck portion 820 may be greater than the outer diameter taper rate of the intermediate portion 520 ($OD_{TR2} > OD_{TR1}$) and the inner diameter taper rate of the neck portion 820 may be greater than the inner diameter taper rate of the intermediate portion 520 ($ID_{TR2} > ID_{TR1}$). The apparatus, methods, and articles of manufacture described herein are not limited in this regard.

Figure 10:
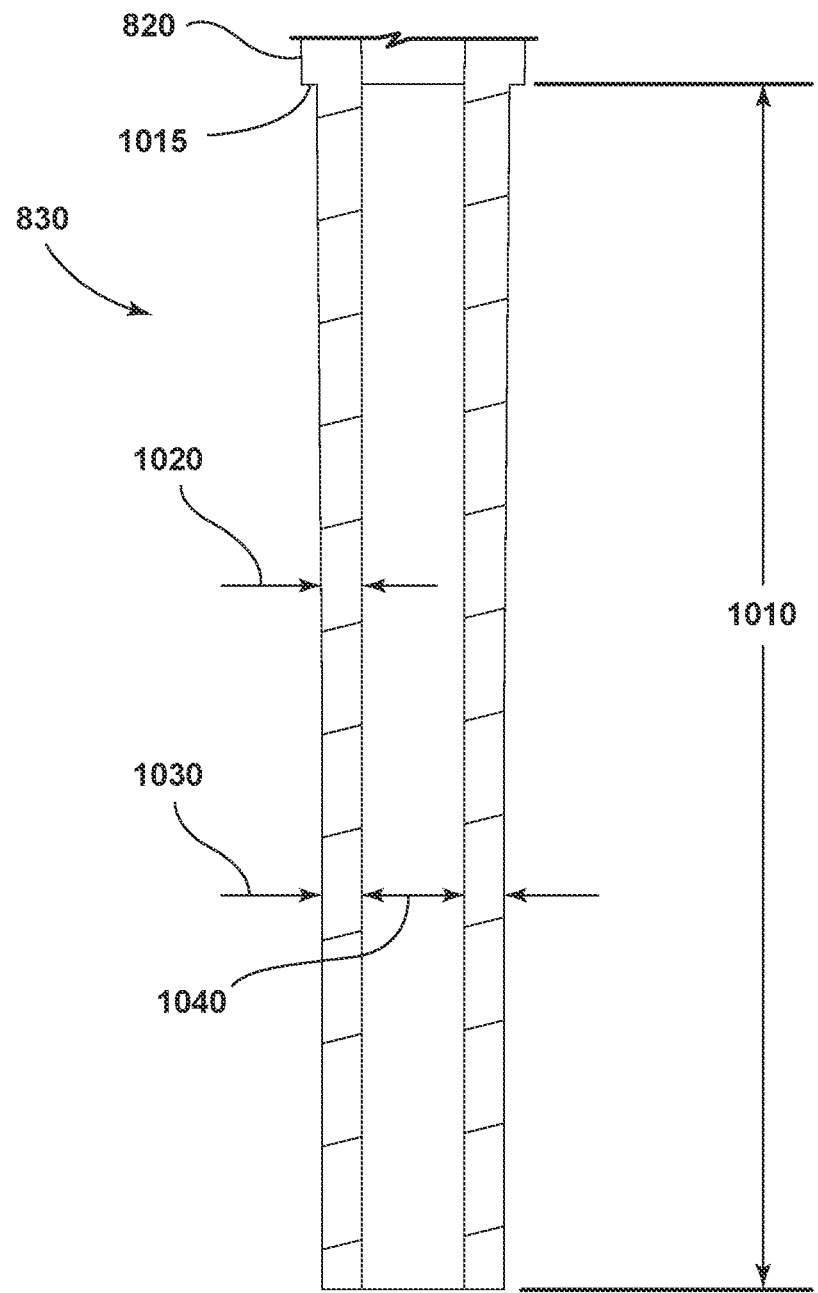
FIG. 10 is an enlarged view of the area specified by reference numeral 10 in FIG. 8.

With reference to FIG. 10, the insert portion 830 may have a shaft profile characterized by at least one of a hollow cylindrical shape and a hollow frustoconical shape extending a length 1010 ($L_{10}$) downward from the neck portion 820. In addition, the insert portion 830 may be stepped inward from the neck portion 820 to define an annular ledge 1015 of the neck portion 820. In one example, the length 1010 of the insert portion 830 may be greater than or equal to 5% of the length 540 of the second tubular portion 220 ($L_{10} \geq 0.05L_5$) and less than or equal to 9% of the length 540 of the second tubular portion 220 ($L_{10} \leq 0.9L_5$). The insert portion 830 may have a uniform or variable wall thickness 1020 ($WT_5$) defined by an outer diameter 1030 ($OD_5$) and an inner diameter 1040 ($ID_5$). The outer diameter 1030 of the insert portion 830 may be less than the inner diameter 480 of the first tubular portion 210 ($OD_5 \approx ID_1$) to permit the insert portion 830 to be at least partially received inside the distal end portion 420 of the first tubular portion 210. The inner diameter 1040 of the insert portion 830 may be less than or equal to the minimum inner diameter 980 of the neck portion 820 ($ID_{5max} \leq ID_{4min}$). The apparatus, methods, and articles of manufacture described herein are not limited in this regard.

Figure 11:
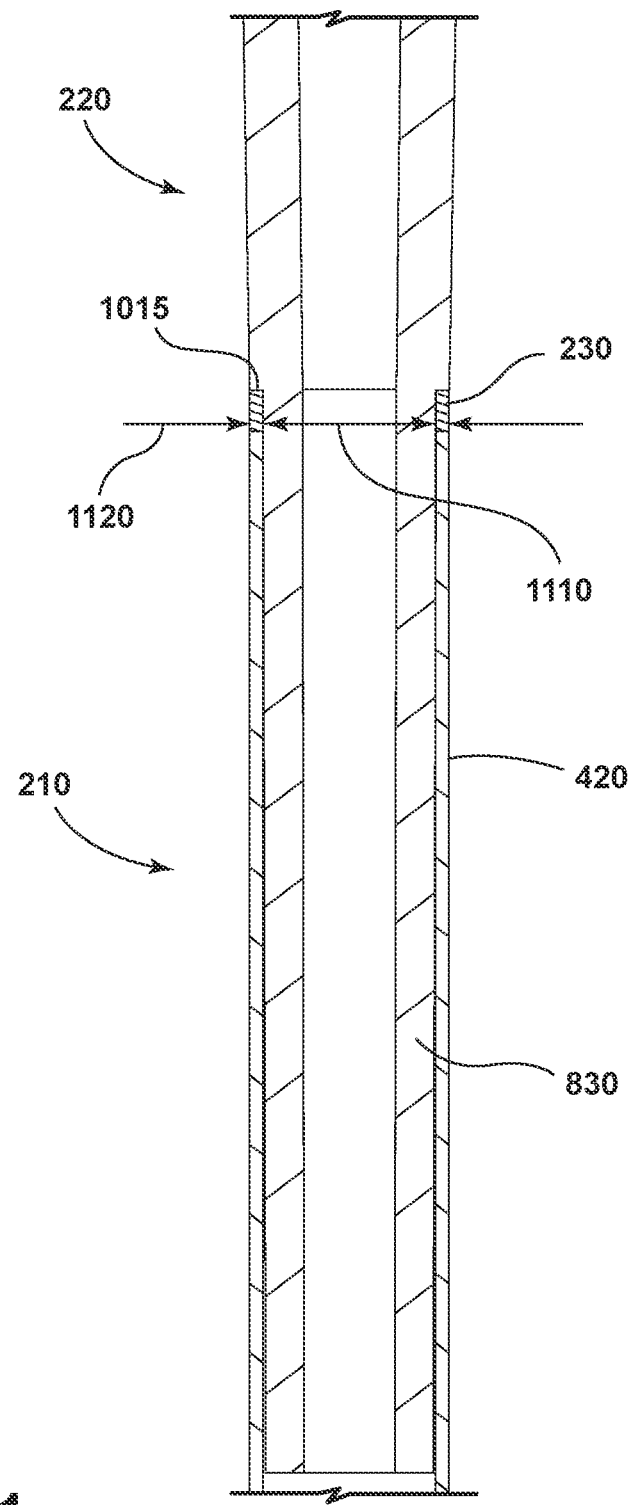
FIG. 11 is a cross sectional view taken along lines 11-11 of FIG. 3.
Figure 12:
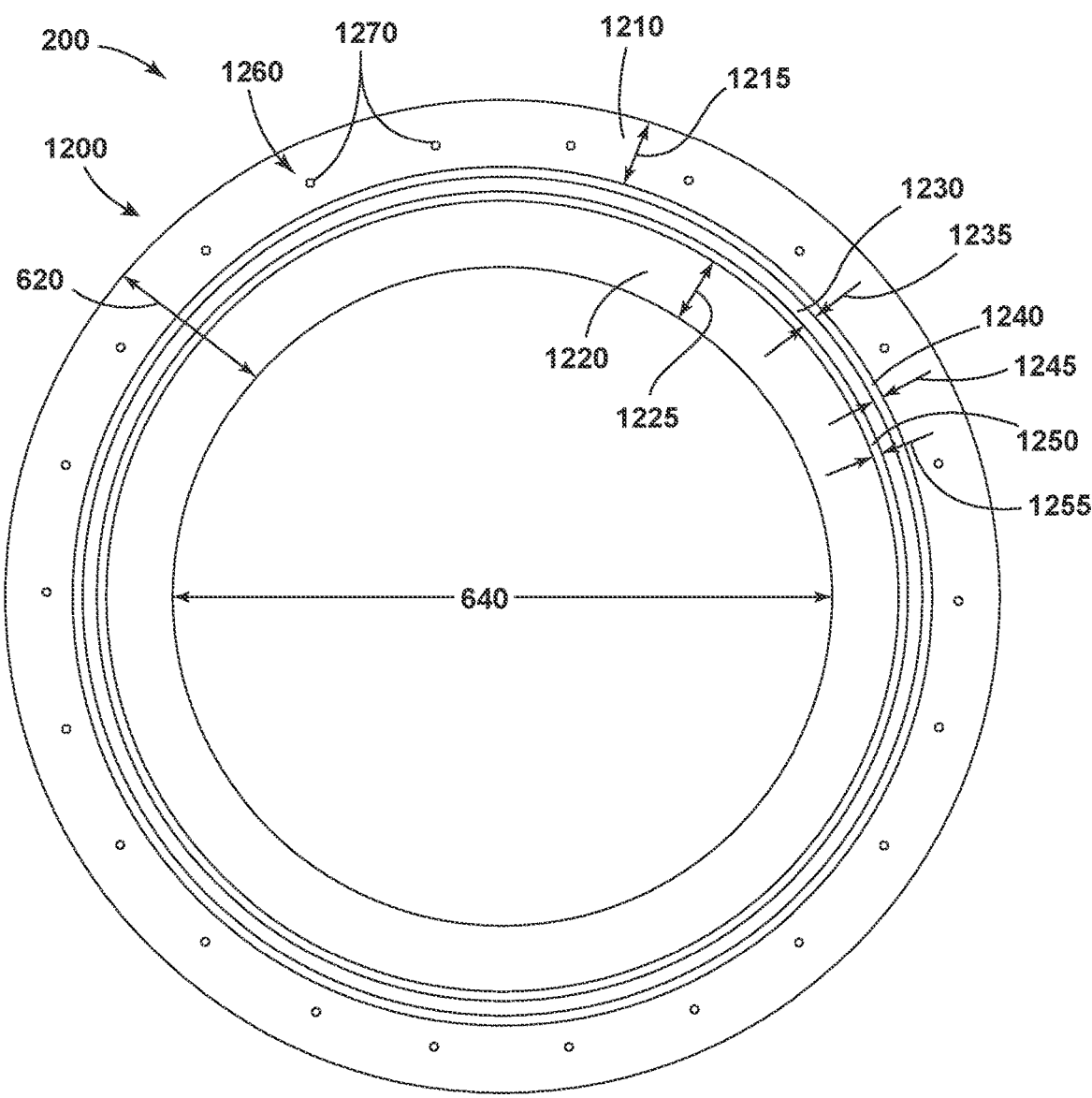
FIG. 12 is a cross sectional view taken along lines 12-12 of FIG. 5.
Figure 13:
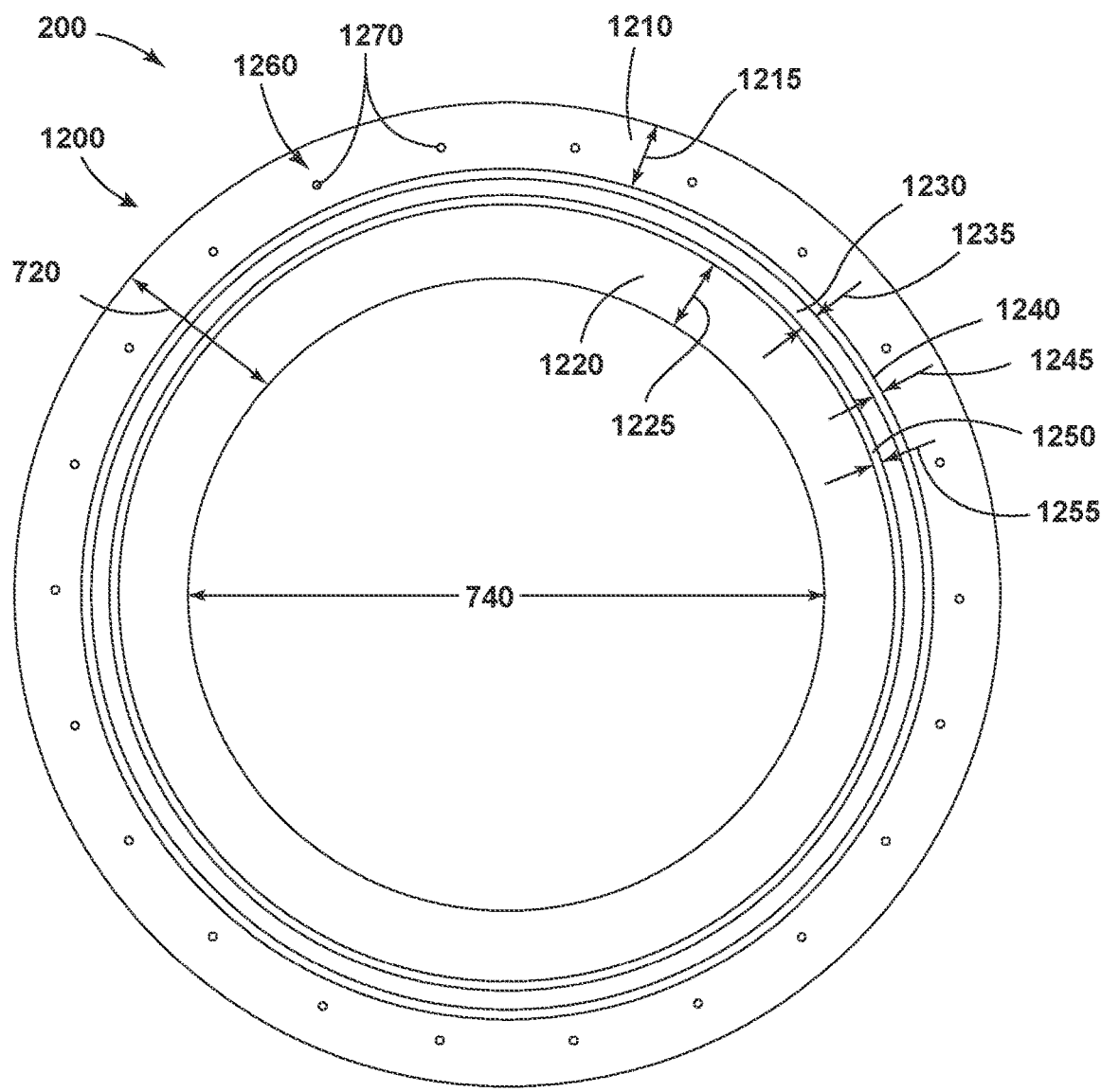
FIG. 13 is a cross sectional view taken along lines 13-13 of FIG. 5.
Figure 14:
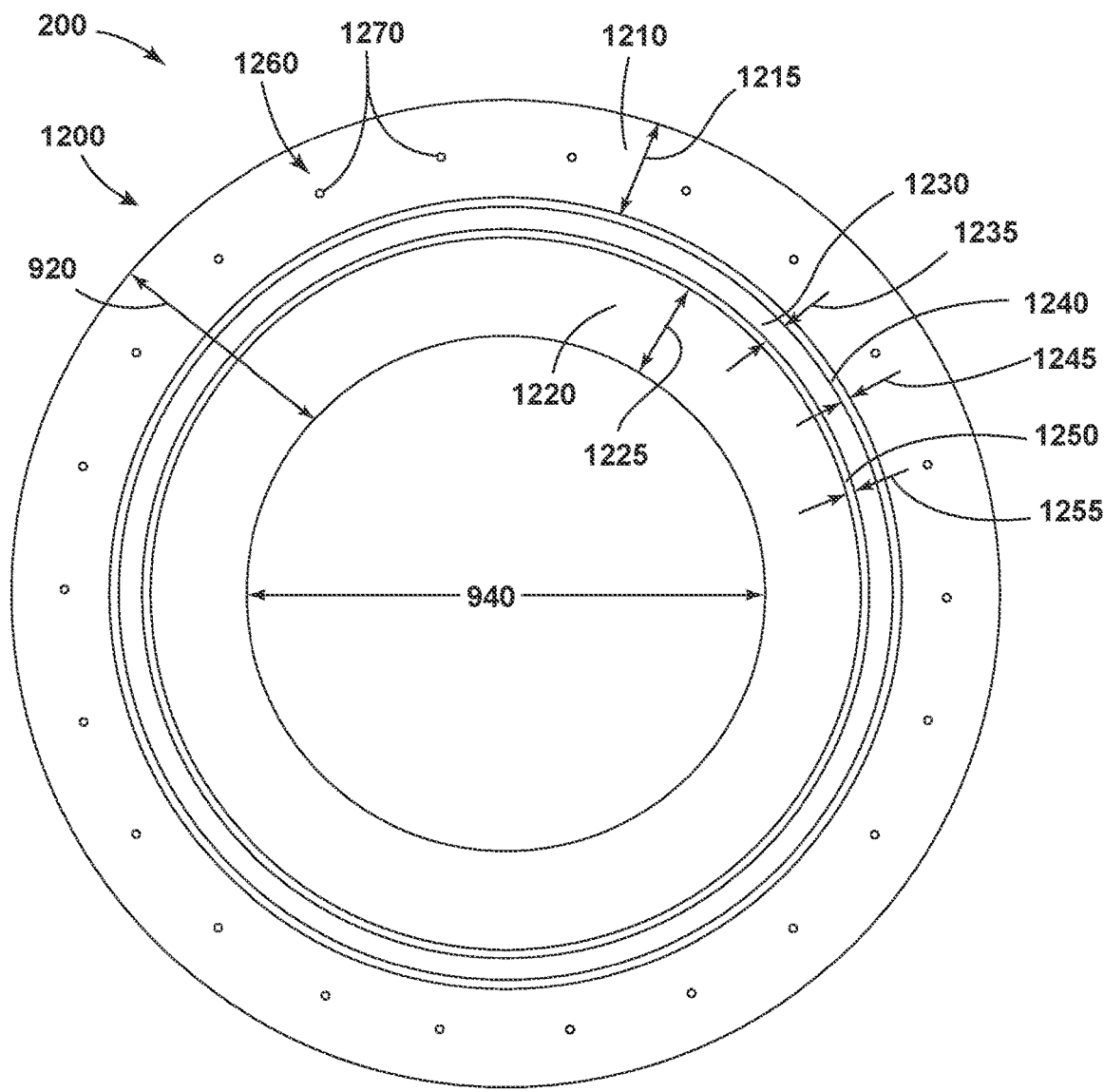
FIG. 14 is a cross sectional view taken along lines 14-14 of FIG. 5.
Figure 15:
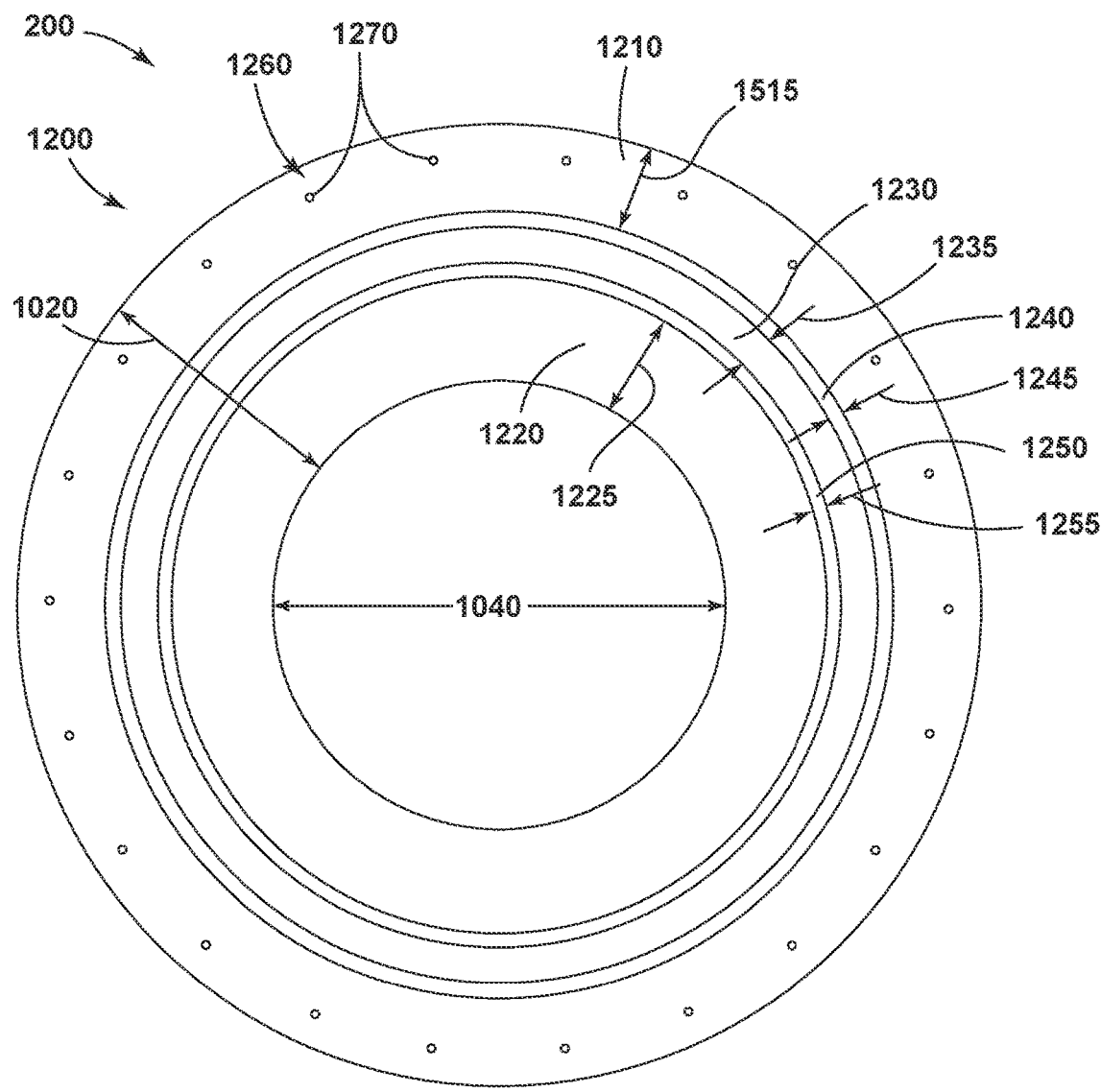
FIG. 15 is a cross sectional view taken along lines 15-15 of FIG. 5.

With reference to FIG. 11, the second tubular portion 220 may be coupled to the first tubular portion 210 by slidably receiving at least a portion of the insert portion 830 inside the distal end portion 420 of the first tubular portion 210. The insert portion 830 may be fixedly secured to the distal end portion 420 using an adhesive such as, but not limited to, epoxy. The distal end portion 420 of the first tubular portion 210 and the neck portion 820 of the second tubular portion 220 may be separated by the spacer 230 at or proximate the annular ledge 1015 defined by the neck portion 820 and the insert portion 830. In assembly, the spacer 230 may be slid over the insert portion 830 and come into abutment with the annular ledge 1015 before inserting the insert portion 830 into the distal end portion 420 of the first tubular portion 210. Accordingly, the spacer 230 may have an inner diameter 1110 ($ID_6$) that is greater than the outer diameter 1030 of the insert portion 830 ($ID_6 > OD_5$). Additionally, the spacer 230 may have an outer diameter 1120 ($OD_6$) that is equal or about equal to the outer diameter 470 of the first tubular portion 210 ($OD_6 \approx OD_1$) and/or the minimum outer diameter 960 of the neck portion 820 ($OD_6 \approx OD_{4min}$) to provide a smooth transition between the distal end portion 420 of the first tubular portion 210 and the neck portion 820 of the second tubular portion 220. Additionally, as described herein, the spacer 230 may have sound and/or vibration dampening properties. Alternatively, the spacer 230 may be omitted such that the distal end portion 420 of the first tubular portion 210 directly abuts the neck portion 820 of the second tubular portion 220 at the annular ledge 1015. The apparatus, methods, and articles of manufacture described herein are not limited in this regard.

With reference to FIGS. 12-15, the second tubular portion 220 may include a multilayer arrangement 1200 concentric with the bore axis 205. The multilayer arrangement 1200 may have one or more layers formed from a composite material exemplarily shown as a first layer 1210, a second layer 1220, and a third layer 1230, and one or more layers formed from an elastomer exemplarily shown as a fourth layer 1240 and a fifth layer 1250. The composite material may include, but is not limited to, a high modulus 60T carbon fiber material and the elastomer material may include, but is not limited to, a rubber material. The first, second, and third layers 1210, 1220, and 1230 may define an outer layer, an inner layer, and an intermediate layer of the second tubular portion 220, respectively. The fourth layer 1240 may be interposed between the first and third layers 1210 and 1230 and the fifth layer 1250 may be interposed between the second and third layers 1220 and 1230. The multilayer arrangement 1200 may extend partially or entirely along the length 540 of the second tubular portion 220. Collectively, the first, second, third, fourth, and fifth layers 1210, 1220, 1230, 1240, and 1250 may define a wall thickness (e.g., shown in FIGS. 12-15 as wall thicknesses 620 ($WT_2$), 720 ($WT_3$), 920 ($WT_4$), and 1020 ($WT_5$), respectively) of the second tubular portion 220 and the third layer 1230 or inner layer may define a bore diameter (e.g., shown in FIGS. 12-15 as inner diameters 640 ($ID_2$), 740 ($ID_3$), 940 ($ID_4$), and 1040 ($ID_5$), respectively) of the second tubular portion 220. The apparatus, methods, and articles of manufacture described herein are not limited in this regard.

In one example, the bore diameter of the second tubular portion 220 may be uniform over the length 610 of the butt end portion 510, decrease over the length 710 of the intermediate portion 520, decrease over the length 910 of the neck portion 820, and decrease over the length 1010 of the insert portion 830. The wall thickness of the second tubular portion 220 may be uniform over the length 610 of the butt end portion 510, the length 710 of the intermediate portion 520, and the length 910 of the neck portion 820 (e.g., $WT_2 = WT_3 = WT_4$). Similarly, a corresponding thickness (e.g., shown in FIGS. 12-14 as thicknesses 1215, 1225, 1235, 1245, and 1255) of each layer of the multilayer arrangement 1200 may also be uniform over the length 610 of the butt end portion 510, the length 710 of the intermediate portion 520, and the length 910 of the neck portion 820. In contrast, the second tubular portion 220 may have reduced wall thickness over the length 1010 of the insert portion 830 (e.g., $WT_5<WT_2$, $WT_5<WT_3$, and $WT_5<WT_4$). For instance, the insert portion 830 may be shaped via a milling process that removes outer material from the multilayer arrangement 1200 to enable the insert portion 830 to be received inside the distal end portion 420 of the first tubular portion 210. Accordingly, the first layer 1210 or outer layer of the multilayer arrangement 1200 may have a reduced thickness (e.g., shown in FIG. 15 as reduced thickness 1515) over the length 1010 of the insert portion 830 while the corresponding thickness of each of the other layers of the multilayer arrangement 1200 may remain unchanged. The thickness of each layer of the multilayer arrangement 1200 may be variously configured to affect certain properties of the golf club shaft 200 such as, but not limited to, stiffness, sound, and/or feel. Accordingly, the thickness of a given layer of the multilayer arrangement 1200 may be similar or different to the thickness of any other layer of the multilayer arrangement 1200. In one example, the thickness of the second layer 1220 may be greater than or equal to the thickness 1215 of the first layer 1210 and greater than the thickness 1235 of the third layer 1230. The thickness 1215 of the first layer 1210 may be greater than the thickness 1235 of the third layer 1230. The thickness 1245 of the fourth layer 1240 and the thickness 1255 of the fifth layer 1250 may be equal or about equal and may be less than each of the thicknesses 1215, 1225, and 1235 of the first, second, and third layers 1210, 1220, and 1230, respectively. The apparatus, methods, and articles of manufacture described herein are not limited in this regard.

Figure 16:
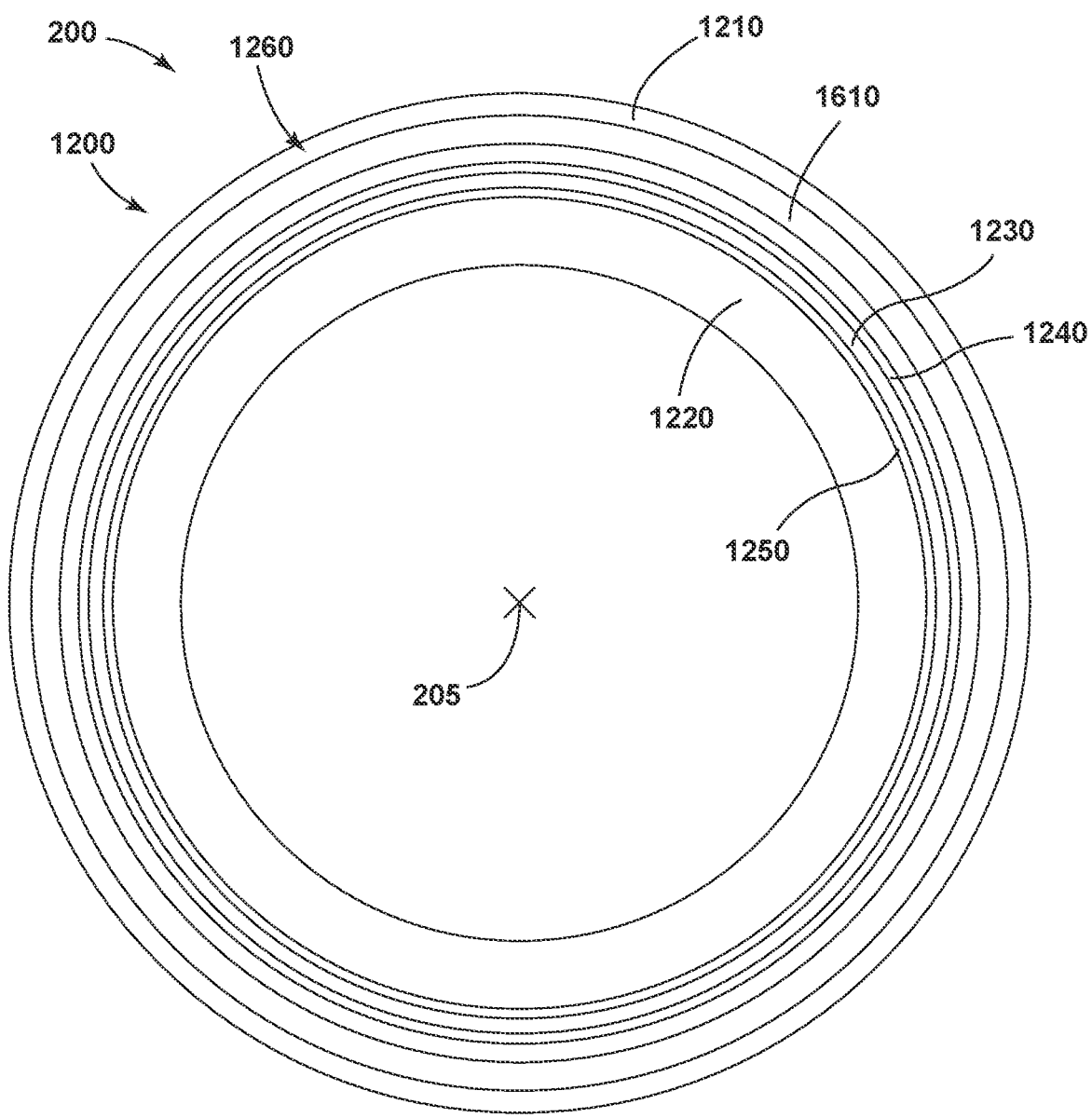
FIG. 16 is a transverse sectional view of second tubular portion according to another example of the apparatus, methods, and articles of manufacture described herein.

The second tubular portion 220 may also include a reinforcing structure 1260 formed from a metal material to enhance the overall stiffness and/or feel of the golf club shaft 200. The metal material of the reinforcing structure 1260 may have a material composition that is similar or different to the metal material of the first tubular portion 210. In one example, the metal material of the reinforcing structure 1260 may include, but is not limited to, a 1000 series steel or a 300 series stainless steel. The reinforcing structure 1260 may be configured as a unitary structure or a plurality of separate structures disposed in or adjacent one or more of the first, second, third, fourth, and fifth layers 1210, 1220, 1230, 1240, and 1250. In the example of FIGS. 12-15, the reinforcing structure 1260 may be configured as a plurality of wires 1270 totaling twenty-two in number. The reinforcing structure 1260 may include any number of wires or components in various configurations. The plurality of wires 1270 may be similar or different in many respects (e.g., length and thickness) and may be spaced apart in a circumferential direction within the first layer 1210. The plurality of wires 1270 may extend a length that is less than or equal to the length 540 of the second tubular portion 220. In the present example, the plurality of wires 1270 may extend the length 540 of the second tubular portion 220. Alternatively, the plurality of wires 1270 may be localized to one or more particular portions of the second tubular portion 220. For instance, the plurality of wires 1270 may extend the length 610 of the butt end portion 510, the length 710 of the intermediate portion 520, and the length 910 of the neck portion 820 and may be omitted from the insert portion 830. In another example, as shown in FIG. 16, the reinforcing structure 1260 may be configured as one or more solid or mesh sheets (e.g., a single sheet 1610 is shown) extending a length that is less than or equal to the length 540 of the second tubular portion 220. The sheet 1610 may be disposed in the first layer 1210 but may otherwise be disposed in or adjacent one or more of the first, second, third, fourth, and fifth layers 1210, 1220, 1230, 1240, and 1250. Alternatively, the reinforcing structure 1260 of FIG. 16 may correspond to one of a plurality of rings that are concentric with the bore axis 205 and spaced apart along a length that is less than or equal to the length 540 of the second tubular portion 220. Alternatively still, the reinforcing structure 1260 of FIG. 16 may correspond to a general outline of a spiral structure extending a length that is less than or equal to the length 540 of the second tubular portion 220. The apparatus, methods, and articles of manufacture described herein are not limited in this regard.

With respect to any of the examples provided herein, the second tubular portion 220 may have a mass per unit length ($mpl_2$) that is greater than or equal to 2.8 grams per inch and less than or equal to 4.2 grams per inch. In another example, the mass per unit length of the second tubular portion 220 may be greater than or equal to 3.0 grams per inch and less than or equal to 4.0 grams per inch. In yet another example, mass per unit length of the second tubular portion 220 may be greater than or equal to 3.10 grams per inch and less than or equal to 3.90 grams per inch. In one example, the first tubular portion 210 and the second tubular portion 220 may have the same or about the same mass per unit length ($mpl_2 \approx mpl_1$) to produce a swing weight that is similar to a steel golf shaft. The apparatus, methods, and articles of manufacture described herein are not limited in this regard.

Figure 17:
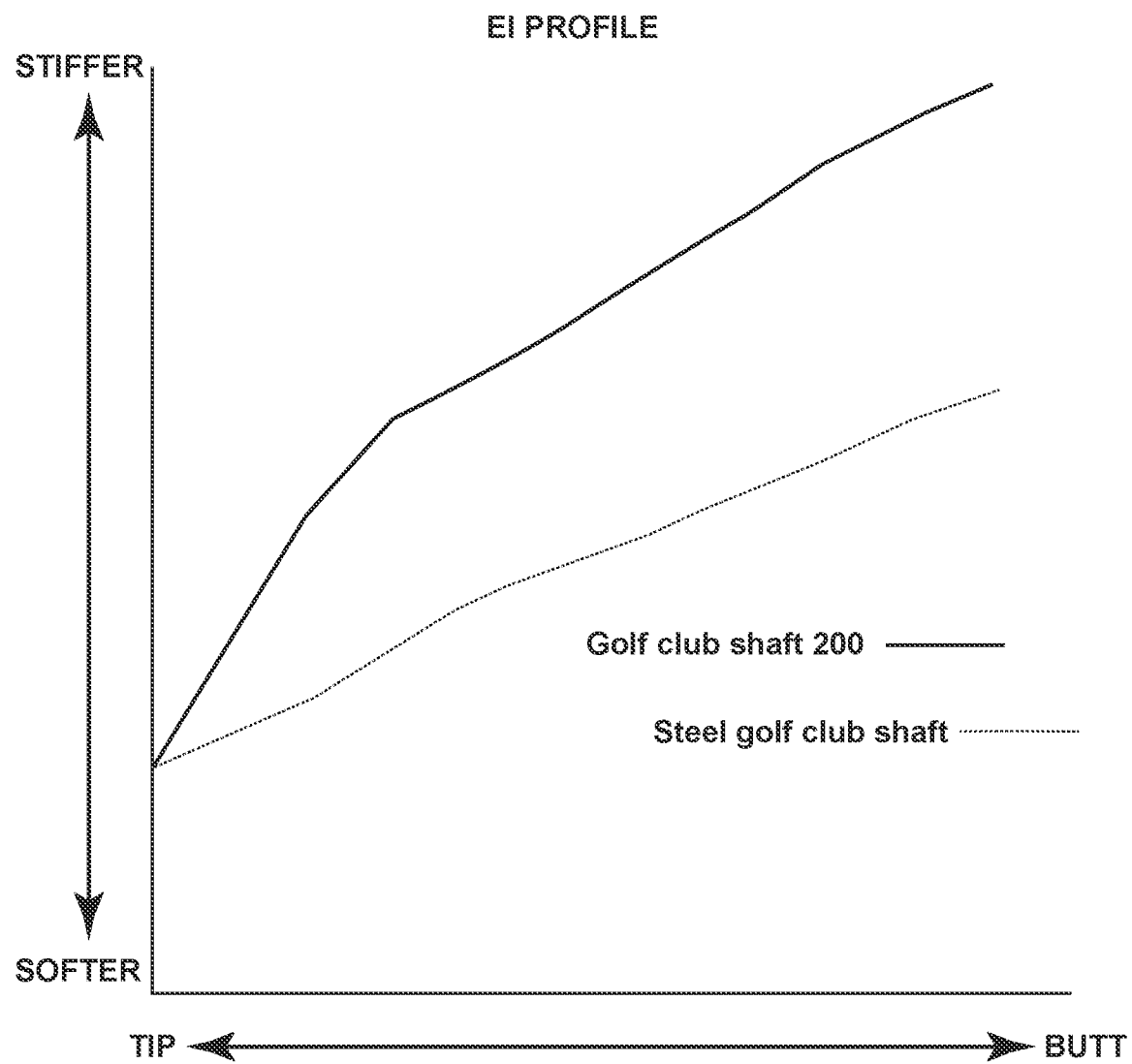
FIG. 17 depicts an EI profile of the golf club shaft of FIG. 2.

The golf club shaft 200 described herein may have improved stiffness and feel. In one example, the club shaft 200 may have a tip frequency greater than 300 cycles per minute (CPM) and a butt frequency greater than 380 CPM. The tip frequency of the golf club shaft 200 may be determined by clamping the tip end portion 410 and applying a load weight toward the end of the butt end portion 510 and measuring the ensuing oscillations. The butt frequency of the golf club shaft 200 may be determined by clamping the butt end portion 510 and applying a load weight toward the tip end portion 410 and measuring the ensuing oscillations. An EI profile is shown in FIG. 17 presenting the local stiffness of the golf club shaft 200 (represented by the solid line) and a steel golf club shaft (represented by the dotted line) of similar mass (e.g., less than or equal to 135 grams) and length (e.g., less than or equal to 37.5 inches). While the golf club shaft 200 may have a similar tip frequency to the steel golf club shaft, the measured butt frequency may far exceed that of the steel golf club shaft. In one test, the butt frequency of the golf club shaft 200 was determined to be about 80 CPM greater than the butt frequency of the steel golf club shaft, representing a CPM increase of over 26%. Accordingly, the golf club shaft 200 may exhibit a greater average stiffness than the steel golf club shaft, which may translate to greater stability and feel. The apparatus, methods, and articles of manufacture described herein are not limited in this regard.

Figure 18:
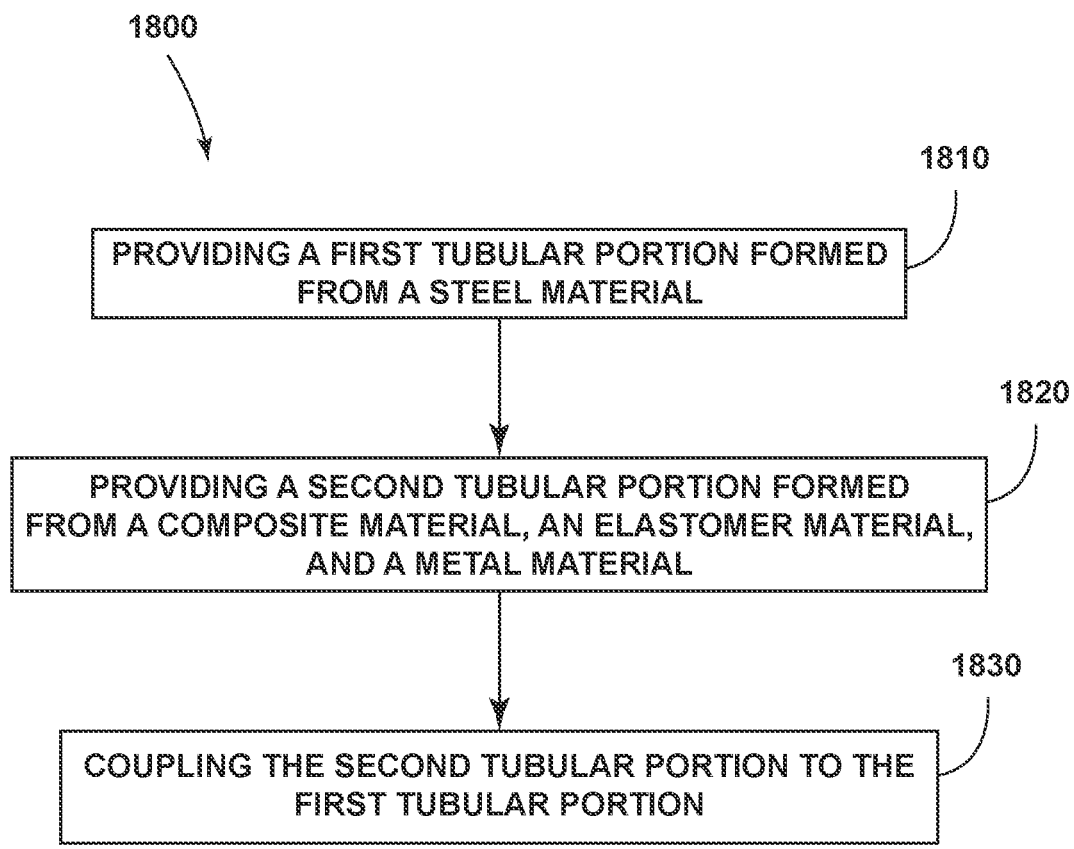
FIG. 18 depicts a process of manufacturing and assembling a golf club shaft according to an example of the apparatus, methods, and articles of manufacture described herein.

FIG. 18 depicts a process for manufacturing and assembling a golf club shaft (e.g., golf club shaft 200). The process 1800 may begin with providing a first tubular portion 210 formed from a steel material (block 1810) and providing a second tubular portion 220 formed from a composite material, an elastomer material, and a steel material (block 1820). In one example, the first tubular portion 210 may be manufactured using a seamless construction process or a welded tube construction process. The second tubular portion 220 may be manufactured by wrapping one or more sheets of the composite material around a steel mandrel to form an inner layer 1220 of composite material. A sheet of elastomer material may be wrapped around the inner layer 1220 of composite material followed by additional sheets of the composite material to form an intermediate layer 1230 of composite material that is separated from the inner layer 1220 of composite material by a layer 1250 of elastomer material. Another sheet of elastomer material may be wrapped around the intermediate layer 1230 followed by additional sheets of the composite material to form an outer layer 1210 of composite material that is separated from the intermediate layer 1230 of composite material by a layer 1240 of elastomer material. The wrapping process may be suspended at any time so that a metal reinforcing structure 1260 may be affixed to any of the composite or elastomer sheets. The reinforcing structure 1260 may configured according to any of the examples provided herein. Once affixed, the wrapping process may resume resulting in the reinforcing structure 1260 being secured in a particular layer or adjacent one or more layers. The foregoing materials may be secured to the mandrel by a binder material to form the general shape of the second tubular portion 220. A heating process may be used to fuse the materials together, thereby producing the second tubular portion 220. In one example, paint and/or decals may be applied to the outer layer 1210 of the second tubular portion 220. To assemble the golf club shaft 200, the second tubular portion 220 may be coupled to the first tubular portion 210 (block 1830). In one example, the second tubular portion 220 may be coupled to the first tubular portion 210 by slidably receiving an insert portion 830 of the second tubular portion 220 inside a distal end portion 420 of the first tubular portion 210 and securing the insert portion 830 to the distal end portion 420 with an adhesive. The insert portion 830 of the second tubular portion 220 may be shaped through a milling process to ensure proper fit inside the distal end portion 420 of the first tubular portion 210. Additionally, a spacer 230 may be slidably received over the insert portion 830 prior to the coupling of the insert portion 830 and the distal end portion 420. As described herein, the spacer 230 may abut and effectively separate the distal end portion 420 of the first tubular portion 210 from a neck portion 820 of the second tubular portion 220. The apparatus, methods, and articles of manufacture described herein are not limited in this regard.

While each of the above examples may describe a certain type of golf club head, the apparatus, methods, and articles of manufacture described herein may be applicable to other types of golf club heads (e.g., a driver-type golf club head, a fairway wood-type golf club head, a hybrid-type golf club head, an iron-type golf club head, a putter-type golf club head, etc.).

Procedures defined by golf standard organizations and/or governing bodies such as the United States Golf Association (USGA) and/or the Royal and Ancient Golf Club of St. Andrews (R&A) may be used for measuring the club head volume of any of the golf club heads described herein. For example, a club head volume may be determined by using the weighted water displacement method (i.e., Archimedes Principle). Although the figures may depict particular types of club heads (e.g., a driver-type club head or iron-type golf club head), the apparatus, methods, and articles of manufacture described herein may be applicable to other types of club head (e.g., a fairway wood-type club head, a hybrid-type club head, a putter-type club head, etc.). Accordingly, any golf club head as described herein may have a volume that is within a volume range corresponding to certain type of golf club head as defined by golf governing bodies. A driver-type golf club head may have a club head volume of greater than or equal to 300 cubic centimeters ($cm^3$ or cc). In another example, a driver-type golf club head may have a club head volume of 460 cc. A fairway wood golf club head may have a club head volume of between 100 cc and 300 cc. In one example, a fairway wood golf club head may have a club head volume of 180 cc. An iron-type golf club head may have a club head volume of between 25 cc and 100 cc. In one example, an iron-type golf club head may have a volume of 50 cc. Any of the golf clubs described herein may have the physical characteristics of a certain type of golf club (i.e., driver, fairway wood, iron, etc.), but have a volume that may fall outside of the above-described ranges. The apparatus, methods, and articles of manufacture described herein are not limited in this regard.

Any of the golf club heads and/or golf clubs described herein may include one or more sensors (e.g., accelerometers, strain gauges, etc.) for sensing linear motion (e.g., acceleration) and/or forces in all three axes of motion and/or rotational motion (e.g., angular acceleration) and rotational forces about all three axes of motion. In one example, the one or more sensors may be internal sensors that may be located inside the golf club head, the hosel, the shaft, and/or the grip. In another example, the one or more sensors may be external sensors that may be located on the grip, on the shaft, on the hosel, and/or on the golf club head. In yet another example, the one or more sensors may be external sensors that may be attached by an individual to the grip, to the shaft, to the hosel, and/or to the golf club head. In one example, data collected from the sensors may be used to determine any one or more design parameters for any of the golf club heads and/or golf clubs described herein to provide certain performance or optimum performance characteristics. In another example, data from the sensors may be collected during play to assess the performance of an individual. The apparatus, methods, and articles of manufacture described herein are not limited in this regard.

Any of the apparatus, methods, or articles of manufacture described herein may include one or more visual identifiers such as alphanumeric characters, colors, images, symbols, logos, and/or geometric shapes. For example, one or more visual identifiers may be manufactured with one or more portions of a golf club such as the golf club head (e.g., casted or molded with the golf club head), painted on the golf club head, etched on the golf club (e.g., laser etching), embossed on the golf club head, machined onto the golf club head, attached as a separate badge or a sticker on the golf club head (e.g., adhesive, welding, brazing, mechanical lock(s), any combination thereof, etc.), or any combination thereof. The visual identifier may be made from the same material as the golf club head or a different material than the golf club head (e.g., a plastic badge attached to the golf club head with an adhesive). Further, the visual identifier may be associated with manufacturing and/or brand information of the golf club head, the type of golf club head, one or more physical characteristics of the golf club head, or any combination thereof. In particular, a visual identifier may include a brand identifier associated with a manufacturer of the golf club (e.g., trademark, trade name, logo, etc.) or other information regarding the manufacturer. In addition, or alternatively, the visual identifier may include a location (e.g., country of origin), a date of manufacture of the golf club or golf club head, or both.

The visual identifier may include a serial number of the golf club or golf club head, which may be used to check the authenticity to determine whether or not the golf club or golf club head is a counterfeit product. The serial number may also include other information about the golf club that may be encoded with alphanumeric characters (e.g., country of origin, date of manufacture of the golf club, or both). In another example, the visual identifier may include the category or type of the golf club head (e.g., 5-iron, 7-iron, pitching wedge, etc.). In yet another example, the visual identifier may indicate one or more physical characteristics of the golf club head, such as one or more materials of manufacture (e.g., visual identifier of "Titanium" indicating the use of titanium in the golf club head), loft angle, face portion characteristics, mass portion characteristics (e.g., visual identifier of "Tungsten" indicating the use of tungsten mass portions in the golf club head), interior cavity and filler material characteristics (e.g., one or more abbreviations, phrases, or words indicating that the interior cavity is filled with a polymer material), any other information that may visually indicate any physical or play characteristic of the golf club head, or any combination thereof. Further, one or more visual identifiers may provide an ornamental design or contribute to the appearance of the golf club, or the golf club head.

Any of the golf club heads described herein may be manufactured by casting from metal such as steel. However, other techniques for manufacturing a golf club head as described herein may be used such as 3D printing or molding a golf club head from metal or non-metal materials such as ceramics.

All methods described herein may be performed in any suitable order unless otherwise indicated herein or otherwise clearly contradicted by context. Although a particular order of actions may be described herein with respect to one or more processes, these actions may be performed in other temporal sequences. Further, two or more actions in any of the processes described herein may be performed sequentially, concurrently, or simultaneously.

The terms "and" and "or" may have both conjunctive and disjunctive meanings. The terms "a" and "an" are defined as one or more unless this disclosure indicates otherwise. The term "coupled," and any variation thereof, refers to directly or indirectly connecting two or more elements chemically, mechanically, and/or otherwise. The phrase "removably connected" is defined such that two elements that are "removably connected" may be separated from each other without breaking or destroying the utility of either element.

The term "substantially" when used to describe a characteristic, parameter, property, or value of an element may represent deviations or variations that do not diminish the characteristic, parameter, property, or value that the element may be intended to provide. Deviations or variations in a characteristic, parameter, property, or value of an element may be based on, for example, tolerances, measurement errors, measurement accuracy limitations and other factors. The term "proximate" is synonymous with terms such as "adjacent," "close," "immediate," "nearby," "neighboring," etc., and such terms may be used interchangeably as appearing in this disclosure.

Recitation of ranges of values herein is merely intended to serve as a shorthand method of referring individually to each separate value falling within the range. Unless otherwise indicated herein, each individual value is incorporated into the specification as if it were individually recited herein. A numerical range defined using the word "between" includes numerical values at both end points of the numerical range. A spatial range defined using the word "between" includes any point within the spatial range and the boundaries of the spatial range. A location expressed relative to two spaced apart or overlapping elements using the word "between" includes (i) any space between the elements, (ii) a portion of each element, and/or (iii) the boundaries of each element.

The use of any and all examples, or exemplary language (e.g., "such as") provided herein is intended merely for clarification and does not pose a limitation on the scope of the present disclosure. No language in the specification should be construed as indicating any non-claimed element essential to the practice of any embodiments discussed herein.

Groupings of alternative elements or embodiments disclosed herein are not to be construed as limitations. Each group member may be referred to and claimed individually or in any combination with other members of the group or other elements disclosed herein. One or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

While different features or aspects of an embodiment may be described with respect to one or more features, a singular feature may comprise multiple elements, and multiple features may be combined into one element without departing from the scope of the present disclosure. Further, although methods may be disclosed as comprising one or more operations, a single operation may comprise multiple steps, and multiple operations may be combined into one step without departing from the scope of the present disclosure.

The apparatus, methods, and articles of manufacture described herein may be implemented in a variety of embodiments, and the foregoing description of some of these embodiments does not necessarily represent a complete description of all possible embodiments. Instead, the description of the drawings, and the drawings themselves, disclose at least one embodiment, and may disclosure alternative embodiments.

As the rules of golf may change from time to time (e.g., new regulations may be adopted or old rules may be eliminated or modified by golf standard organizations and/or governing bodies such as the USGA, the R&A, etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

Further, while the above examples may be described with respect to golf clubs, the apparatus, methods and articles of manufacture described herein may be applicable to other suitable types of sports equipment such as a fishing pole, a hockey stick, a ski pole, a tennis racket, etc.

Although certain example apparatus, methods, and articles of manufacture have been described herein, the scope of coverage of this disclosure is not limited thereto. On the contrary, this disclosure covers all apparatus, methods, and articles of articles of manufacture fairly falling within the scope of the appended claims either literally or under the doctrine of equivalents.

What is claimed is:

1. A golf club shaft comprising:
   a first tubular portion formed from a first material and extending along at least a portion of a length of the golf club shaft;
   a second tubular portion coupled to the first tubular portion and extending along the length of the golf club shaft, the second tubular portion having a wall thickness defined by a multilayer arrangement concentric with a bore axis of the golf club shaft, the multilayer arrangement including:
- a first layer formed from a second material and defining an outer layer;
- a second layer formed from the second material and defining an inner layer;
- a third layer formed from the second material and defining an intermediate layer;
- a fourth layer formed from a third material and interposed between the first layer and the third layer;
- a fifth layer formed from the third material and interposed between the second layer and the third layer; and
- a plurality of wires formed from a fourth material and disposed in one or more of the first layer, the second layer, the third layer, the fourth layer, and the fifth layer, wherein the first, second, third, and fourth materials are different from one another, and wherein a length of the plurality of wires is less than or equal to a length of the second tubular portion.

2. A golf club shaft as defined in claim 1, wherein the plurality of wires are spaced apart in a circumferential direction within the first layer and extend a length of the second tubular portion.

3. A golf club shaft as defined in claim 1, wherein the length of the second tubular portion is greater than a length of the first tubular portion, and wherein the second tubular portion has a mass per unit length equal or about equal to a mass per unit length of the first tubular portion.

4. A golf club shaft as defined in claim 1, wherein the first material is a metal material, the second material is a composite material, the third material is an elastomer material, and the fourth material is a metal material having a different material composition than the first material.

5. A golf club shaft as defined in claim 1, further comprising a spacer abutting the first tubular portion and the second tubular portion, wherein the spacer is formed from a fifth material that is different from each of the first, second, third, and fourth materials.

6. A golf club shaft as defined in claim 1, wherein a thickness of the second layer is greater than a thickness of the first layer and a thickness of the third layer, wherein the thickness of the first layer is greater than the thickness of the third layer, wherein a thickness of the fourth layer is equal or about equal to a thickness of the fifth layer, and wherein the thickness of the fourth layer and the thickness of the fifth layer are less than the thickness of the first layer, the thickness of the second layer, and the thickness of the third layer.

7. A golf club shaft as defined in claim 1, wherein the first tubular portion and the second tubular portion have a combined tip frequency greater than 300 cycles per minute, and wherein the first tubular portion and the second tubular portion have a combined butt frequency greater than 380 cycles per minute.

8. A golf club shaft comprising:
- a first tubular portion formed from a first material;
- a second tubular portion coupled to the first tubular portion, a transverse cross section of the second tubular portion having:
  - a first layer formed from a second material and defining an outer layer;
  - a second layer formed from the second material and defining an inner layer;
  - a third layer formed from the second material and defining an intermediate layer;
  - a fourth layer formed from a third material and interposed between the first layer and the third layer;
  - a fifth layer formed from the third material and interposed between the second layer and the third layer; and
  - a reinforcing structure formed from a fourth material and disposed in or adjacent at least one of the first layer, the second layer, the third layer, the fourth layer, and the fifth layer, wherein the first, second, third, and fourth materials are different from one another, wherein a length of the second tubular portion is greater than a length of the first tubular portion, and wherein the second tubular portion has a mass per unit length equal or about equal to a mass per unit length of the first tubular portion.

9. A golf club shaft as defined in claim 8, wherein the reinforcing structure includes a plurality of wires extending a length that is less than or equal to a length of the second tubular portion.

10. A golf club shaft as defined in claim 8, wherein the first material is a 4140 steel material, the second material is a high modulus 60T carbon fiber material, the third material is a rubber material, and the fourth material is a 1000 series steel material or a 300 series stainless steel material.

11. A golf club shaft as defined in claim 8, further comprising a spacer abutting the first tubular portion and the second tubular portion, wherein the spacer is formed from a fifth material that is different from each of the first, second, third, and fourth materials.

12. A golf club shaft as defined in claim 8, wherein a thickness of the second layer is greater than a thickness of the first layer and a thickness of the third layer, wherein the thickness of the first layer is greater than the thickness of the third layer, wherein a thickness of the fourth layer is equal or about equal to a thickness of the fifth layer, and wherein the thickness of the fourth layer and the thickness of the fifth layer are less than the thickness of the first layer, the thickness of the second layer, and the thickness of the third layer.

13. A golf club shaft as defined in claim 8, wherein the first tubular portion and the second tubular portion collectively define a straight shaft.

14. A golf club shaft as defined in claim 8, wherein the first material is a metal material, wherein the second material is a composite material, wherein the third material is an elastomer material, and wherein the fourth material is a metal material having a different material composition to the first material.

15. A golf club shaft comprising:
- a first tubular portion formed from a first material and having a tip end portion and a distal end portion; and
- a second tubular portion coupled to the distal end portion of the first tubular portion, the second tubular portion including a butt end portion, and a transverse cross section of the second tubular portion having:
  - a plurality of layers arranged concentrically about a bore axis of the second tubular portion; and
  - a reinforcing structure disposed in or adjacent at least one layer of the plurality of layers, wherein the reinforcing structure is formed from a material that is different from the first material, wherein each layer of the plurality of layers is formed from a material that is different from the first material and the material of the reinforcing structure, wherein at least two layers of the plurality of layers are different from one another in material composition, and wherein a mass per unit length of the first tubular portion and a mass per unit length of the second tubular portion is greater than or equal to 3.10 grams per inch and less than or equal to 3.90 grams per inch.

16. A golf club shaft as defined in claim 15, wherein the first tubular portion and the second tubular portion have a combined tip frequency greater than 300 cycles per minute, and wherein the first tubular portion and the second tubular portion have a combined butt frequency greater than 380 cycles per minute.

17. A golf club shaft as defined in claim 15, wherein a length of the second tubular portion is greater than a length of the first tubular portion, and wherein the mass per unit length of the second tubular portion is equal or about equal to the mass per unit length of the first tubular portion.

18. A golf club shaft as defined in claim 15, wherein the reinforcing structure includes a plurality of wires extending a length that is less than or equal to a length of the second tubular portion.

19. A golf club shaft as defined in claim 15, wherein the first material is a 4140 steel material, wherein each layer of the plurality of layers is formed from one of a composite material or an elastomer material, and wherein the reinforcing structure is formed from one of a 1000 series steel material or a 300 series stainless steel material.

20. A golf club shaft as defined in claim 15, wherein the first tubular portion and the second tubular portion have a combined mass that is less than or equal to 135 grams and a combined length that is less than or equal to 37.5 inches.

\* \* \* \* \*

UNITED STATES PATENT AND TRADEMARK OFFICE
CERTIFICATE OF CORRECTION

| | | |
|---|---|---|
| PATENT NO. | : 12,465,824 B2 | Page 1 of 1 |
| APPLICATION NO. | : 17/939758 | |
| DATED | : November 11, 2025 | |
| INVENTOR(S) | : Kirtley et al. | |

It is certified that error appears in the above-identified patent and that said Letters Patent is hereby corrected as shown below:

On the Title Page

Item (73), in "Assignee", in Column 1, Line 1, delete "PARSON" and insert --PARSONS-- therefor Signed and Sealed this
Tenth Day of February, 2026

John A. Squires
*Director of the United States Patent and Trademark Office*